United States Patent [19]

Minter

[11] Patent Number: 5,223,847
[45] Date of Patent: Jun. 29, 1993

[54] PILOT WARNING SYSTEM

[76] Inventor: Jerry B. Minter, 48 Normandy Heights Rd., Convent Station, N.J. 07961

[21] Appl. No.: 566,258

[22] Filed: Aug. 13, 1990

[51] Int. Cl.$^5$ .................. G01S 5/02; G01S 13/00; G01S 5/04
[52] U.S. Cl. ..................... 342/417; 342/30; 342/432
[58] Field of Search ............... 342/432, 433, 435, 417, 342/455, 439, 30, 38; 343/829, 724, 729, 815, 818, 819; 340/961

[56] References Cited

U.S. PATENT DOCUMENTS

| | | | |
|---|---|---|---|
| 2,419,987 | 5/1947 | Carlson | 342/439 |
| 2,672,609 | 3/1954 | Simpson | 342/439 |
| 3,851,334 | 11/1974 | Coleman et al. | 342/30 |
| 4,027,307 | 5/1977 | Litchford | 342/38 |
| 4,379,296 | 4/1983 | Farrar et al. | 343/829 |
| 4,631,546 | 12/1986 | Dumas et al. | 343/833 |

Primary Examiner—Greogry C. Issing
Attorney, Agent, or Firm—Donald P. Gillette

[57] ABSTRACT

This invention relates to a system to alert an aircraft pilot of presence and general location of other aircraft that might constitute a collision threat to the pilot's aircraft. An antenna means operates in first and second modes characterized by respective first and second directivity conditions resulting in first and second gains for signals from a certain direction. Analysis means compares the amplitudes of the first and second responses to produce an angle-indicating signal locating a potential collision threat without having to generate radio signals other than those already being generated by equipment in other aircraft in response to ground ATC interrogation.

30 Claims, 7 Drawing Sheets

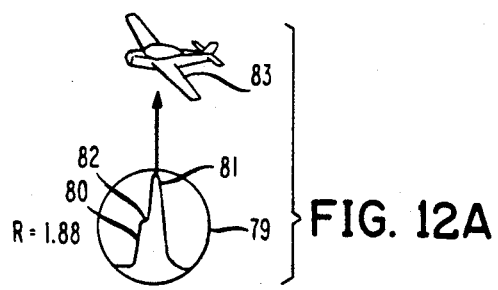
FIG. 12A
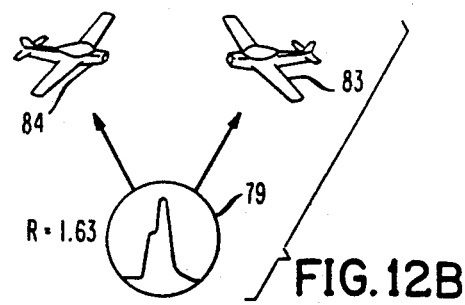
FIG. 12B
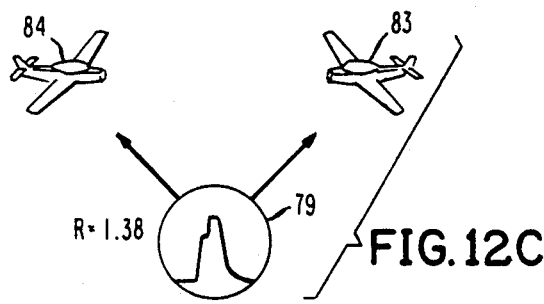
FIG. 12C
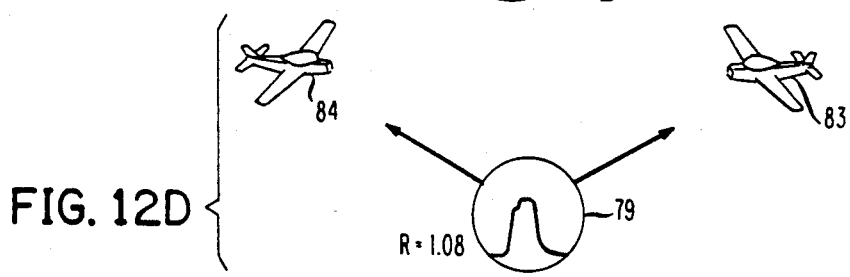
FIG. 12D
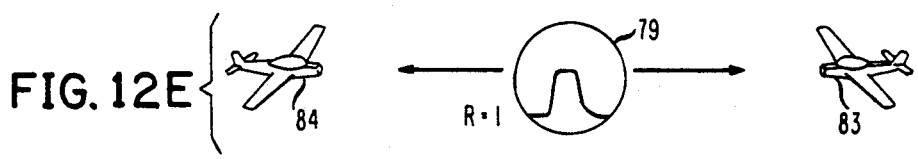
FIG. 12E
FIG. 13
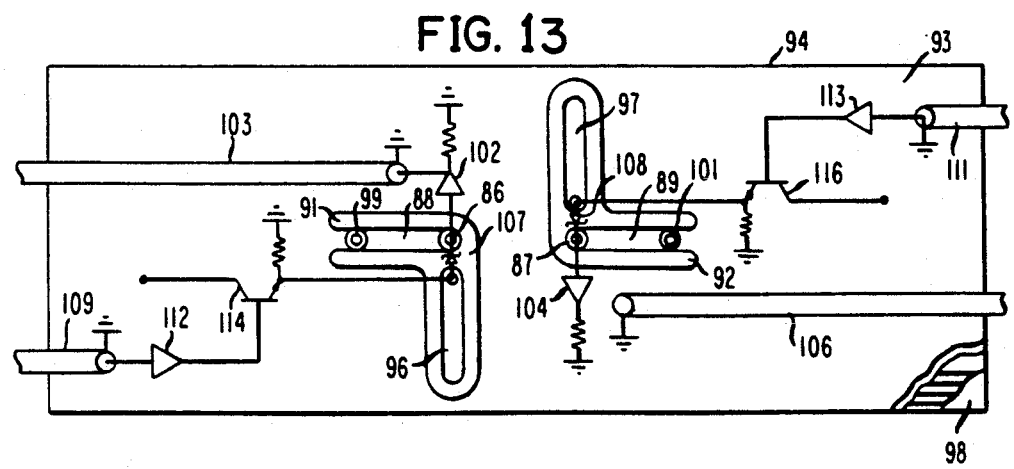

PROCESSOR CIRCUIT

PILOT WARNING SYSTEM

BACKGROUND OF THE INVENTION

This invention relates to a system to alert an aircraft pilot of the presence and general location of other aircraft that might constitute a collision threat to the pilot's aircraft. In particular, the invention relates to a system that analyzes transponder signals from the other aircraft to determine the presence, direction, distance, and altitude of a potential collision threat relative to the pilot's aircraft and does so passively, i.e., without adding to the transmissions that already crowd that part of the radio frequency band.

The avoidance of midair collisions is primarily the responsibility of the pilots of the aircraft that might be involved, and it is appropriate that this be so since the pilot has the most immediate concern about the possibility of such an event. The Federal Aviation Agency (FAA) does maintain radar and communications systems that enable operators on the ground to advise pilots of the presence, general location, and altitude of other aircraft, particularly in the vicinity of major airports. However, the advice is not always available and complete. Pilots may be advised to avoid proceeding in one direction because of the danger of collision, only to find that the area toward which they are directed has other dangers.

There are also current discussions on expanding the current system in a way that would have a stored program tell the pilot the proper evasive action to take. Such programs are based on limited assumptions that may not be appropriate for real life situations, and it is much to be preferred that the pilot be presented with all immediately relevant information concerning all other nearby aircraft so that the pilot can decide on the best course of action. Insofar as other aircraft are concerned, the pilot needs to know the distance, direction, and altitude of those aircraft relative to the pilot's aircraft. While such information could be obtained if the pilot's aircraft had radar equipment on board, a great many owners cannot afford the expense, and their aircraft could not carry the equipment.

The Federal Aviation Agency (FAA) maintains an Air Traffic Control Radar Beacon System (ATCRBS) in which primary surveillance radar stations monitor the location of aircraft in their vicinity by transmitting a burst of microwave energy about 400 times per second from a highly directional antenna that focuses almost all of the energy in a narrow, wedge-shaped beam only about 1° wide. The antenna is rotated about once every 4.3 seconds, and when the beam sweeps through the part of the sky in which an aircraft is flying, a tiny fraction of the energy from each burst strikes the aircraft, which reflects it in all directions. Only a tiny fraction of the reflected energy is directed back to the antenna of the surveillance station, where it is picked up and utilized by circuits in the receiving section. The reflected pulse signals received at the surveillance station are detected and fed to a plan position indicator where they are displayed by pulsing the beam of a cathode-ray tube to generate a pattern of bright spots on the screen, corresponding to the locations of aircraft around the station. Reflections from large metal aircraft, especially those not too far from the station, produce relatively bright spots on the screen of the c.r.t., but the spots produced by echoes from smaller aircraft, particularly those not made of metal, and from distant aircraft, are not so bright.

It was realized long ago that the weak reflected signals received by the radar ground stations made it difficult to keep accurate track of the aircraft, even those that reflected signals relatively effectively. Consequently, a system was devised to enable ground stations to send out encoded, interrogating signals and to enable each aircraft equipped to do so to transmit responsive, encoded pulse signals. The apparatus installed in the aircraft to receive and analyze the ground station's signal and to transmit a response to it is called a transponder. The response, while transmitted omnidirectionally, is many orders of magnitude more powerful than a radar reflection signal. Since the signal transmitted by the aircraft's transponder is received by the ground station about 3 $\mu$sec after the echo signal, but while the antenna of the ground station is still aimed in the direction of that aircraft, the equipment at that station can use the transponder signal to enhance or replace an otherwise weak presentation of an echo signal. Furthermore, the highly directional antenna used by the ground station in this improved system keeps the station from receiving many interfering signals, and it is relatively easy to separate the desired signals received at any instant from the undesired ones received simultaneously.

The radar station actually includes two radar systems. The one that transmits the narrow 1° beam and simply displays a brightened spot representing the echo is called the primary system. The other, which causes the transponder in the aircraft to generate its own responsive signal, is called the secondary surveillance radar (SSR) system. Antennas for both of the ground station's systems rotate in unison, but the SSR antenna is not as directive as that for the primary radar and sends out a wedge-shaped beam about 4° wide transmitted on a carrier frequency of 1030 MHz and repeated about 400 times per second. One such group, called Mode A, consists of two pulses, each 0.80 $\mu$sec long and with the leading edge of the second pulse 8 $\mu$sec behind the leading edge of the first. When a Mode A interrogation signal is received by a transponder receiver, it causes the transponder to generate a Mode A response signal consisting of pulses encoded with the identification assigned to that aircraft at least for that flight and transmitted on the transponder frequency of 1090 MHz.

Another interrogation signal, called a Mode C signal, transmitted by the SSR system on the same 1030 MHz interrogating frequency, consists of two pulses with the leading edge of the second 21 $\mu$sec behind the leading edge of the first. This causes the aircraft's transponder to transmit, on its 1090 MHz carrier, a Mode C response signal consisting of pulses encoded to represent the aircraft's altitude, if the aircraft is properly equipped with an encoding altimeter. All aircraft flying within 30 miles of major airports are required to have operating transponders so equipped. Still other groupings of SSR pulses are in use or have been proposed for eliciting other information from the aircraft's transponder.

The Mode A identification signal transmitted by a transponder consists of two framing pulses, which have leading edges spaced 20.3 $\mu$sec apart, and from 0 to 12 pulses, or bits, arranged in four groups of three bits each at specific times between the framing pulses. All of these response pulses, i.e., the framing pulses as well as the encoding pulses, are identical in amplitude and in duration, which is 0.45 $\mu$sec. There are actually 13 equally spaced time slots for encoding pulses between the framing pulses, but the seventh slot is always empty. The pulses constitute information bits, and the system is set up so that, if a pulse is transmitted at one of the assigned times, the system will treat it as a 1 bit, while if no pulse is sent by the transponder at that time, it will be treated as a 0 bit. The total number of identifications possible with a binary signal having twelve bits, as this complete signal does, is 4096. However, certain numbers are reserved for special purposes in the SSR system, so the total available for use is less than the theoretical maximum.

The Mode C interrogation causes a properly equipped transponder to send a binary signal encoded to represent the pressure altitude of the aircraft, based on a standard barometric pressure of 29.92" of mercury. The Mode C response signal for altitudes below 30,800' uses only nine bits, which makes it possible to identify 512 different altitudes. At low altitudes, starting at −1000' (which can occur even at actual altitudes above sea level, due to the fact that the measurement is based on a standard altimeter setting of 29.92" of mercury), the system identifies altitudes at 100' intervals. The nine bits used for transmitting altitude information are identical in every way with nine of the twelve bits used for transmitting identification information, which means that 512 of the 4096 possible identification codes are indistinguishable in form from altitude codes.

Transponder receivers are tuned to the 1030 MHz signal from the ground stations, not to the 1090 MHz frequency transmitted by transponder transmitters, but even if an aircraft did carry a receiver tuned to that frequency, enabling it to receive signals from transponders of other aircraft within the range of the receiver, the pilot would not be able to tell, from the mere reception of a second aircraft's transponder signal, whether a given pulse train received from the transponder of another aircraft represented an identification signal or an altitude signal. The test would have to be a negative one, because any transponder signal that could be an altitude signal could also be an identification signal, but the reverse is not true. In addition, altitude signals above 30,800' use more than nine bits, and many jets fly higher than that.

Ground station apparatus has no difficulty in determining whether a received transponder signal is a Mode A identification signal or a Mode C altitude signal, since the station apparatus recognizes each transponder response as being a response to the type of interrogating signal the ground station has just transmitted. In addition, ground stations receive transponder responses almost exclusively from aircraft toward which the highly directive SSR antenna of the ground station is pointed.

Apparatus in one aircraft receiving transponder signals from all other aircraft within receiving range has neither of those advantages.

However, ground stations always use a standard sequence of interrogation: they send out two Mode A signals requesting information as to the identification of any aircraft receiving those signals, followed by one Mode C signal requesting information as to the altitude of that aircraft. This makes it possible for any aircraft having a receiver incorporating the analytical system of this invention to compare three successive groups of pulse signals from the transponder of the second aircraft and tell both the identification and the altitude of the other aircraft. An exception occurs during "squawk ident" when the pilot is requested by the ground station operator to cause the transponder to transmit only the identification code for a 20 second interval. If the altitude code is the same as the assigned identification code, it would not matter which was considered to be the altitude code.

If the second aircraft is within a predetermined number of feet of the altitude of the pilot's aircraft, it is necessary for the pilot to know in which direction to look for the other aircraft. Two aircraft flying at the same altitude may be far enough apart to allow some time to take appropriate evasive action, or they may be following diverging courses that will never cause them to collide. However, even if those aircraft are several miles apart, and are not headed directly toward each other, they can still be heading toward a collision. That will be true if they are both heading toward the same point in space and are holding a fixed bearing relative to each other, even if they are flying at different speeds. The pilot of the aircraft having the apparatus described herein would be able to recognize those conditions and would know where to look for the other aircraft. As a result, the pilot would be able to take appropriate evasive action as well as being able to notify the ground station of the existence of the other aircraft.

OBJECTS AND SUMMARY OF THE INVENTION

It is one object of this invention to provide a system for the pilot of an aircraft to determine, on the basis of transponder signals received by that aircraft, the direction in which potential collision threats may be located, so as to be able to take appropriate evasive action.

It is another object to provide a system for detecting potential midair collision threats from other aircraft without having to generate radio signals other than those that are already being generated by the equipment in the other aircraft in response to ground ATC interrogation.

Another object is to provide a simple antenna system with directivity control means to assist in determining the direction from which pulse signals received by that antenna system originate.

Yet another object is to provide means for analyzing transponder signals from another aircraft to determine the altitude of that aircraft.

A further object is to store transponder signals received from other aircraft to distinguish successive signals and determine whether they are from one or more aircraft.

Yet another object is to be able to analyze changes in those signals to determine whether or not evasive action should be taken and, if so, in what direction such evasive action can be safely taken, i.e., laterally, vertically, or some combination of the two.

A further object is to provide a simplified circuit for analyzing a pulse signal received by an aircraft to determine whether that signal comes from a first direction or a direction approximately 180° removed from that first direction.

Still a further object is to provide a system for analyzing successive signals from another aircraft to determine the rate of closing with that aircraft.

Further objects will be apparent to those skilled in the art after they have studied the following description and the accompanying drawings.

In accordance with this invention, a receiving circuit tuned to the transponder transmission frequency of 1090

MHz and capable of responding to the 0.45 μsec pulses making up transponder signals receives such signals by way of an antenna system, or array, of controllable directivity. In its simplest form, the antenna system comprises two parallel elements, one referred to as the antenna and the other as a parasitic element, each with an effective length equal to about one-fourth of the wavelength λ at 1090 MHz and both extending from a common conductive ground plane and spaced apart by a distance between approximately λ/16 and 3λ/16, and preferably equal to λ/8. The antenna is connected to the input of a receiving circuit, and the parasitic element is connected to an electronic switching circuit controlled by the receiving circuit either to maintain the parasitic element isolated from the conductive ground plane at the operating frequency or to short-circuit it to ground. When the parasitic element is isolated from ground, it has no effect on the antenna, which then is omnidirectional. When the base of the parasitic element, i.e., the part of the parasitic element substantially coplanar with the ground plane, is short-circuited to ground, it operates as a reflector, making the antenna more sensitive to signals arriving at the antenna from the direction opposite that of the parasitic element and less sensitive to those arriving from the same direction as the parasitic element.

The electronic switching circuit is controlled by a signal derived from the received pulse signal to change the directivity while that signal is being received. The transponder signal consists of pulses that have a specific form, which makes it possible for the amplitude of the portion of that pulse signal received before the directivity of the antenna was modified to be stored long enough to be compared with the amplitude of a later portion received after the directivity has been modified. The ratio of these amplitudes can be correlated with the directivity pattern of the antenna system to determine the approximate angle between the imaginary geometrical plane common to the two elements and the source of the signal. This imaginary geometrical plane can be considered the center plane of the antenna system, and the information derived from the incoming signal can be presented to alert the pilot to the presence of another aircraft, but with only two elements in the antenna system, the reception is symmetrical about the center plane. Adding at least one more parasitic element properly oriented with respect to the first two and grounding the parasitic elements in the proper order makes it possible for the system to eliminate the ambiguity due to symmetry, and this makes it possible for the apparatus to inform the pilot more precisely as to the direction in which to look for the other aircraft.

The absolute amplitude of the received signal can also be measured and correlated with an altitude alert to be used instantly as a proximity warning. It can also be stored and compared with amplitudes measured on later sweeps, spaced about 4.3 seconds apart, of the SSR interrogating beam past the other aircraft to tell whether that aircraft is getting closer or farther away.

It is neither necessary nor desirable to alert the pilot to look for another aircraft if that aircraft is not likely to be a threat. False alarms would be likely to cause the pilot to ignore the correct information provided by the system. Even a nearby aircraft would not be a threat if its altitude differed sufficiently from that of the pilot's aircraft. Further in accordance with this invention, the relative altitude of the other aircraft can be determined by comparing the Mode C altitude signal from the other aircraft with the altitude signal generated by an encoding altimeter in the pilot's aircraft and with signals representing a range of altitudes above and below that of the pilot's aircraft. This information can be used to prevent alerting the pilot unless the altitude of the other aircraft is too near the pilot's own.

Also in accordance with this invention, the altitude, signal strength, and bearing information can be stored, along with the identification code of the other aircraft, and those data can be compared with data similarly derived on each sweep of the SSR radar beam past the other aircraft to determine any changes of altitude, bearing, and proximity. In addition, the acquisition of transponder signals can be timed to minimize reception of noise, whether in random form or as signals not wanted at a particular time. Because the information made available to the pilot by this system indicates in which direction to look for the other aircraft that may constitute threats of midair collisions, and at what level relative to the pilot's aircraft, the pilot can determine whether to climb or dive or turn left or right, or any combination of horizontal and vertical directions, and that determination can be based not only on transponder information from one other aircraft but on transponder information from all other aircraft in the proximity of the pilot's aircraft.

BRIEF DESCRIPTION OF THE DRAWINGS

FIGS. 12A–12E show typical waveforms of individual transponder pulses in conjunction with drawings of aircraft positioned at angles, relative to the graph in FIG. 2, that would result in those waveforms.

FIG. 13 shows a modified embodiment of the circuit in FIG. 8.

DETAILED DESCRIPTION OF THE INVENTION

Figure 1:
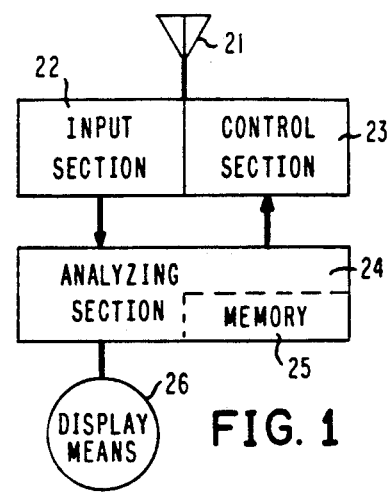
FIG. 1 is a simplified block diagram of the system of this invention.

The block diagram of the warning system in FIG. 1 is located in an aircraft that will be referred to throughout this description as the pilot's aircraft, and the source of signals to be analyzed will be referred to as the other aircraft.

The system includes antenna means, or array, 21 tuned to receive SSR pulse signals transmitted by aircraft transponders on a frequency of 1090 MHz and connected to receiving means comprising an input section 22, an antenna control section 23, and an analyzing section 24. The input section feeds signals received by the antenna array to the analyzing section 24 in which selected signal parts are compared to obtain information about the location of the other aircraft. The analyzing section then supplies signals to the control section to cause the latter to operate as switching means to switch the antenna system between an omnidirectional mode and a directional mode.

The analyzing section 24 can include means to extract such information as altitude and identification codes, the signal strength of the incoming signal, the bearing of the other aircraft from the pilot's aircraft, the rate of closing, and, in the worst case, the time till impact. It can also distinguish which SSR station is interrogating the other aircraft's transponder, if there are several stations that might be doing so. For complete analysis, the system requires comparison with previously received signals or with an earlier part of the same signal, and the system can include memory means 25 connected to the analysis section 24 for that purpose. While the memory means is shown as a separate section, it can be combined with the analysis section to form a computer, which, ideally, would be dedicated to the generation of information in accordance with this invention.

Display, or warning, means 26 connected to the analysis section provides communication, either visual or audible or both, to warn the pilot if the analysis section generates a signal that indicates the presence of another aircraft. This signal includes information to cause the display means to indicate if the altitude of the other aircraft is close to the altitude of the pilot's aircraft and to indicate the direction from the pilot's aircraft to the other aircraft, thereby making it possible for the pilot to locate the other aircraft quickly and to decide what evasive action, if any, to take to avoid the collision. It can also provide a more urgent warning if the other aircraft gets too close both horizontally and vertically.

Figure 2:
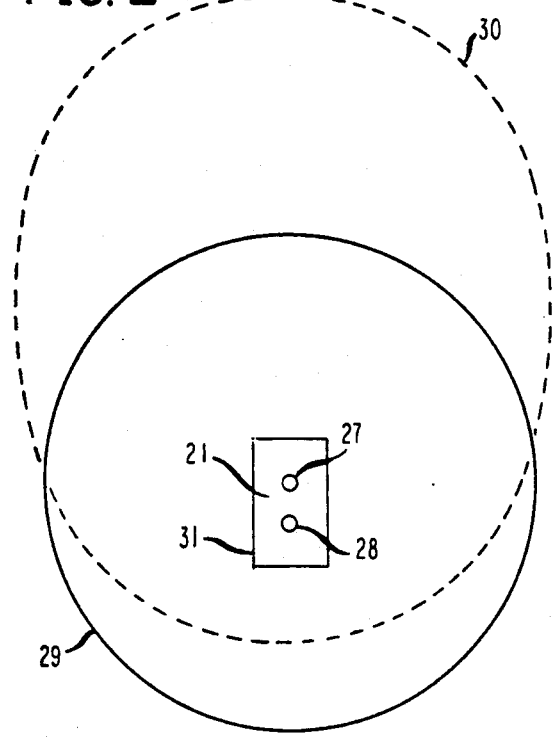
FIG. 2 is a graph of the two radiation patterns of a two-element antenna arrangement according to this invention.
Figure 7:
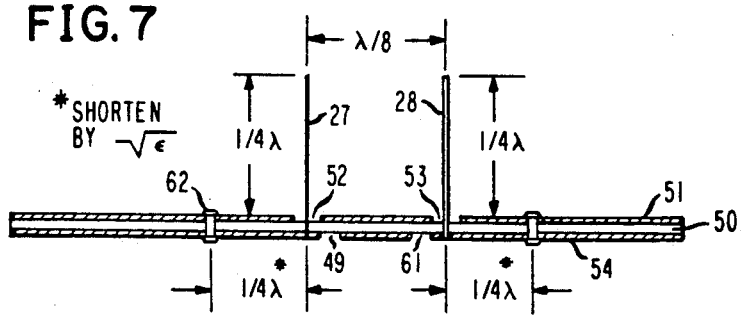
FIG. 7 is a side view of the two-element antenna array in FIG. 2.

This invention bases the determination of the relative bearing angle from the pilot's aircraft to another aircraft on certain characteristics of the antenna array 21, which can be a simple one having at least two modes of operation. The antenna array is not just a single element but, in its simplest form, can consist of only two elements 27 and 28, as shown in FIGS. 2 and 7. Its operating modes include an omnidirectional mode and a directional one, the radiation patterns of which are illustrated in the plots 29 and 30, respectively, in FIG. 2. The elements 27 and 28 in this figure are not drawn to scale with respect to the radiation patterns. The array need not be highly directive in its directional mode; having it retain a more or less elliptical or bulbous shape but offset in such a way that the sensitivity in one direction is on the order of twice as great as in the omnidirectional mode is adequate.

As shown in FIG. 2, the radiation pattern of the antenna in its directional mode has a somewhat elliptical form. This pattern results in a noticeable increase in sensitivity in what will be referred to as the forward direction, a reduction in the opposite direction, and little change with respect to signals originating from lateral locations midway between those two directions. The increase in sensitivity when the antenna array is operating in its directional mode as compared with its unidirectional mode can be measured by dividing the radial distance from the origin to any point along the pattern 30 by the distance along the same radius from the origin to the circular omnidirectional pattern 29. As will be discussed hereinafter in connection with FIGS. 12A-12E, there is a substantial difference between the ratios along different angles.

All of these ratios can be stored in a table in the memory of the system when the apparatus is installed in the pilot's aircraft, which permits them to be looked up in flight to determine the direction in which the pilot should look to find another aircraft. To do so requires that the apparatus in the pilot's aircraft measure the strength of the signal from the other aircraft when the antenna system 21 in the pilot's aircraft is operating in one mode and then in the other mode and divide the numerical value of one measurement by the numerical value of the other. The resulting ratio can then be compared with the values in the stored table to determine which angular direction has the same ratio. That angle can then be made known to the pilot as the direction in which to look for the other aircraft.

Of course, measuring the signal strength, calculating the ratio, and looking up the stored values in the table must all be done quickly, and should be carried out by automatic means. Digital processing means are especially useful. Extreme accuracy is not mandatory; pilots are accustomed to being told by ground station operators to look in directions based on the hour locations on the face of a clock, and those locations are 30° apart. Even with information that another aircraft is on a 44° radial, say, it would be difficult for a pilot to correlate that exact angle with the direction in which to look. Still, it is extremely helpful to know that there is another aircraft to look for in a fairly exact angular location, and the pilot is far more likely to spot the other aircraft than if there were no information at all as to its relative position. In addition, both the pilot's aircraft and the other aircraft are in continuous motion relative to each other, and a given angular relationship is not likely to remain constant for very long. The worst case is when the angular relationship does remain constant, for that means that the two aircraft may be heading toward a common point and will arrive there at the same time. As a result, it is quite possible that they might collide there, if they are at the same altitude, but this very constancy in angular relationship adds to the time the pilot has to discover the other aircraft and makes it more likely that the pilot, having been alerted several times (each time the ground station interrogates the other aircraft, which is about once every 4.3 sec.) to the existence of another aircraft in the same angular position, will see it and be able to veer away from the collision by turning, climbing, or diving, as appropriate.

The two elements 27 and 28 constituting the simple array 21 responsible for the omnidirectional pattern 29 and the directive pattern 30 are shown from above in FIG. 2 and are not to scale relative to the patterns. The element 27 will be referred to as the antenna element or, more briefly, as the antenna, and the element 28 as a parasitic element. Each element extends perpendicularly about $\lambda/4$ from a flat, or substantially flat, conductive ground plane 31. They are thus parallel to each other and are preferably spaced about $\lambda/8$ apart in a common, imaginary geometrical plane with the parasitic element 28 located in the 180° direction from the antenna 27, as shown in FIG. 2. While the $\lambda/8$ spacing provides optimum directivity in this simple antenna system, a useful improvement in directivity can be obtained by spacing the elements anywhere between about $\lambda/16$ and about $3\lambda/16$ apart. Electromagnetic waves are affected by distributed parameters of the elements and the dielectric constants of the media with which the waves interact, and the measurements given in terms of wavelength in this description and in the accompanying claims are to be understood as being stated with these modifying effects in mind.

When the parasitic element 28 is isolated from ground, i.e., from the ground plane, it does not affect the omnidirectional reception pattern 29 of the antenna element 27, but when the base of the parasitic element is grounded, it changes the directivity pattern to that illustrated by the pattern 30. The pattern 30 is substantially symmetrical about an imaginary geometrical plane perpendicular to the ground plane and common to both of the elements 27 and 28. The apparent strength of a signal received from a source spaced from the antenna 27 in the 0° direction (which is in the geometrical plane common to both elements) is increased about 6 db., or even more, relative to its strength when the parasitic element 28 is isolated from ground and the antenna element 27 is operating according to the omnidirectional pattern 29. The reason for this 6 db. increase is believed to be due to the fact that when a wave, which may be represented by a vector, is received by the antenna 27 from the 0° direction, it has to travel $\lambda/8$ farther to reach the parasitic element 28. When this wave is reflected back to the antenna from the grounded parasitic element, it has to travel another $\lambda/8$, or a total of $\lambda/4$ to reach the antenna, and it may be represented by a vector that has rotated 90°. During that time, the incoming wave at the antenna has passed through ¼ of a cycle and may also be represented by a vector that has rotated 90°. Since these two vectors are in phase, their addition represents the doubling of the power fed into the antenna 27, thus producing a 6 db. gain. However, at the short wavelength of a 1090 MHz signal, distributed parameters are important, and it is possible that calculated lengths and distances may not be those actually operative. This accounts for the ratios shown in FIG. 2, in which the ratio calculated from actual measurements of a signal received from the 0° direction was 1.88 rather than the expected 2.00. In other measurements, the actual gain has been measured as somewhat higher than the expected maximum of 6 db. As previously stated, the theoretical values stated herein should not be considered to be precisely the values that will actually be encountered, but they are sufficiently good approximations.

While the two-element antenna array 21 in FIG. 2 makes it possible to tell surprisingly accurately how far another aircraft is off to one side of the line of flight of the pilot's aircraft, provided the other aircraft is somewhat ahead of the pilot's aircraft, the symmetry of pattern 30 makes it impossible to tell, from just one set of comparisons, whether the other aircraft is off to the right or the left. As shown in FIG. 2, signals from a source located to the right of straight ahead would produce the same ratio as they would if the same source were located the same number of degrees to the left. This ambiguity can be eliminated by providing means to make a second comparison along a direction at an angle to that at which the first comparison was made.

Figure 3:
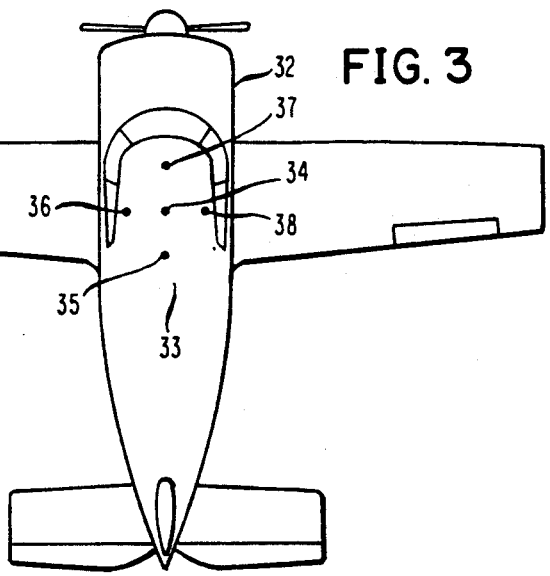
FIG. 3 shows a top view of an aircraft with a five-element antenna array mounted in accordance with one embodiment of this invention.

Preferably, the elements 27 and 28 are centrally mounted on top of the cabin of the pilot's aircraft, so that the imaginary geometrical plane through both elements is common to an imaginary vertical geometrical plane through the center of the aircraft. FIG. 3 shows an aircraft 32 with an antenna array 33 so mounted. The metal body of the aircraft, or a substitute therefor, in the case of non-metallic aircraft, is the conductive ground plane, and the array 33 has one antenna element 34 and four parasitic elements 35–38 located at the corners of a square, each element in the array having an effective height of $\lambda/4$ above the ground plane and being spaced approximately $\lambda/8$ from the antenna element 34. The array 33 is not drawn to the same scale as the aircraft 32 since the spacing between the elements 34–38 is between one and two inches at the 1090 MHz frequency transmitted by transponders. The elements 37 and 35 are mounted directly fore and aft, respectively, of the element 34, and the other two elements 36 and 38 are directly to the left and right, respectively. By short-circuiting each parasitic element to ground, which would be the metal body of the aircraft 32, in the sequence 35, 36, 37, 38 and keeping the other three isolated from ground, the lobe of maximum sensitivity, similar to the lobe 30 in FIG. 2, can be directed to each of the four quadrants in order. Assuming the elements 35–38 are placed as just stated, the four quadrants are: directly ahead, directly to the right, directly to the rear, and directly to the left.

Comparing the ratios of signal strength in the omnidirectional mode to that in the directional modes for the two quadrants in which the incoming signal is enhanced makes it possible to tell to within a few degrees the bearing of the other aircraft from the pilot's aircraft. Since other aircraft more or less behind the pilot's aircraft may not be visible to the pilot, depending on the design of the cabin, it may appear not to be worth the expense to include the element 35 and the control circuitry to ground it. However, most midair collisions occur when one aircraft overtakes another, so it is important to be warned of an aircraft overtaking from the rear, even if it cannot be seen. In addition, either the element 36 or the element 38 may also be eliminated, because a measurement using one of the side elements 36 or 38 will either result in an increase or a decrease in field strength relative to the omnidirectional measurement, depending on which side element is used and on which side the other aircraft is located. Either result will eliminate the initial left-or-right ambiguity.

However, measurements to both sides and even to the rear may be desirable to provide equal accuracy in all directions. As may be recognized from looking at the radiation patterns in FIG. 2, the ratio of the directional signal to the omnidirectional signal for signals received in the two-element array 21 and originating more or less to the rear of the pilot's aircraft, i.e., in the direction between about 120° and 240° cannot be interpreted as accurately as a measurement within 300° and 60°. The parasitic element 37 allows the system to treat signals received from the rear of the pilot's aircraft with the same accuracy as signals from the front.

Figure 4:
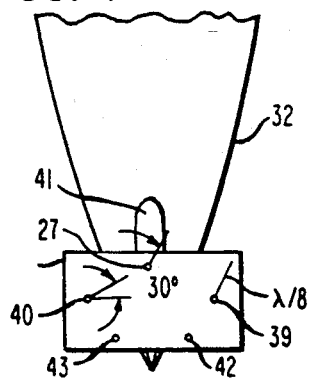
FIG. 4 is an enlarged plan view of the vertical fin of the aircraft in FIG. 3 with a three-element antenna array arrangement mounted on it in accordance with this invention.

Furthermore, it is not necessary that the parasitic elements be located at the points of a square. For example, FIG. 4 shows two parasitic elements 39 and 40 mounted on it at angles of ±120° relative to the element 27 in the dead ahead direction to provide coverage to the front and over a wide angle to each side. The elements are on a small, horizontal plate 48 on top of the vertical fin 41 of the aircraft 32, a small part of which is shown in larger scale in this figure than in FIG. 3. Alternatively, the two parasitic elements 39 and 40 could be located in positions 42 and 43, respectively, closer to the 180° direction, which would narrow the angle of enhanced reception but would provide better coverage directly ahead. However, it is to be noted that, even in a small aircraft, the top of the vertical fin is several meters from the cabin, and provisions have to be made to accommodate the transmission of signals from the fin to the instrument panel and back.

Figure 5:
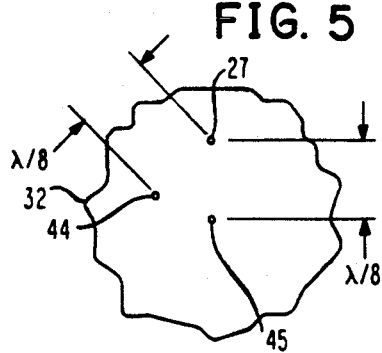
FIG. 5 is a plan view of an asymmetrical three-element antenna array according to this invention.

Parasitic elements could also be placed asymmetrically with respect to the element 27, as shown by the elements 44 and 45, which are illustrated as being mounted on the aircraft 32, only a small part of which is shown in FIG. 5, to enhance reception of signals in preferred directions.

Figure 6:
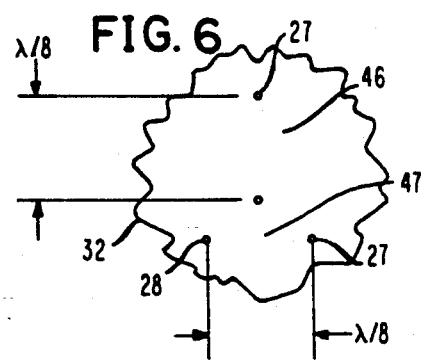
FIG. 6 shows two separate antenna arrays aimed in different directions.

Completely separate antenna arrays 46 and 47 aimed in different directions and feeding signals to separate input circuits are also within the scope of this invention and are shown in FIG. 6. The array 46 consists of elements 27 and 28, and the array 47 consists of the elements 27' and 28'. Both arrays are shown mounted on a portion of the aircraft 32.

Aircraft antennas, including the antenna and parasitic elements described herein, are subject to the build-up of electrostatic charges. To prevent such build-up, all of the elements should be conductively connected to the metal body of the aircraft, assuming that the aircraft is so constructed. In order to permit the elements to be so connected, advantage can be taken of the fact that a transmission line having a length equal to $\lambda/4$ at the operating frequency and short-circuited at one end is equivalent to an open circuit at the other end for signals having that wavelength. Similarly, if such a line is left open at one end, it will be electrically equivalent to a short circuit at the other end.

Figure 8:
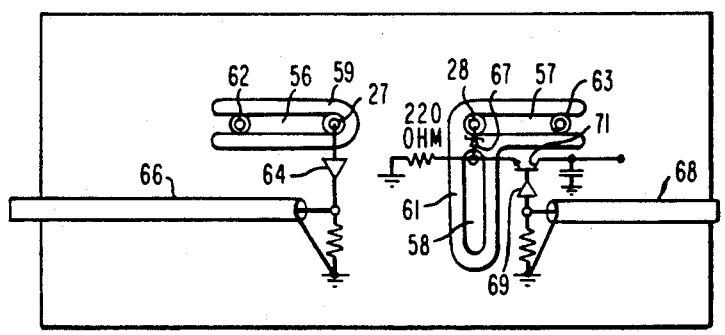
FIG. 8 is a view of the under side of the two-element antenna system in FIG. 7 and includes a schematic circuit diagram, partly in block form, for connecting the antenna elements in the system in FIG. 1.

FIGS. 7 and 8 show the two-element antenna arrangement of FIG. 2 in greater detail. The elements 27 and 28 are physically mounted on a double-sided printed-circuit board 50 and extend perpendicularly from one side of it. That side is coated with a thin conductive layer 51 (such as copper) unbroken except for two holes 52 and 53 through which the elements 27 and 28 extend. Layer 51 is the conductive ground plane and is to be conductively connected to the metal body of the aircraft. The other side of the board is also coated with a thin conductive layer 54, which is connected through the board 50 to the layer 51 at several points and in which three quarter-wave lines 56–58 are defined by removal of regions 59 and 61 surrounding the lines. The lines 56–58 are shown as open strip lines, but they may need to be shielded. Alternatively, quarter-wave lengths of coax lines, which are self-shielding, may be used instead of strip lines. If the insulating material used as the base material for the board 50 is Teflon or Kel-F, a quarter-wave line at 1090 MHz is about 1.75" long. The layers 51 and 54 should be joined by a number of through-connectors.

The antenna element 27, preferably made of silver-plated one-sixteenth inch steel rod for strength combined with good microwave conductivity, is conductively connected to one end of the quarter-wave line 56, for example by being soldered to it, and the parasitic element 28 is similarly connected to one end of the line 57. The elements 27 and 28 are spaced apart by a distance between about $\lambda/16$ and $3\lambda/16$ and preferably by approximately $\lambda/8$, and, in this embodiment, the lines 56 and 57 are aligned with each other. At a distance of about $\lambda/4$ from the element 27, the line 56 is directly connected to the conductive ground plane 51 by means of a connector 62 that passes through the board 50. The line 57 is similarly connected directly to the ground plane by a connector 63 that passes through the board 50 and is spaced about $\lambda/4$ from the radiating element 28. The fact that the quarter-wave transmission lines 56 and 57 are short-circuited at one end makes them the equivalent of open circuits at 1090 MHz at the other end where they are connected to the elements 27 and 28. At the same time, any static charges that may accumulate on the elements 27 and 28 can leak directly to ground by way of conductive connectors 62 and 63.

The antenna 27 is connected directly to the input terminal of a preamplifier 64, which is feeds the amplified signal to a coaxial transmission line 66 leading to the input and control circuits 22 and 23 in FIG. 1. The preamplifier not only improves the signal-to-noise ratio of transponder signals picked up by the antenna 27 but also reduces the sensitivity of the system to changes in the effective impedance of the antenna element 27 when the operation is changed from omnidirectional to directional.

The base of the parasitic element is directly connected to the one end of the quarter-wave line 58 by a PIN, or Schottky, diode 67. When the diode has a large enough current flowing through it to saturate it, it becomes, in effect, a very low impedance—approximately 1 ohm, which is close enough to zero to be considered as such. This allows the diode 67 to be used to connect the base of the parasitic element 28 to ground. In addition, the diode must be charac-terized, as the Schottky is, by the ability to be turned on and off in a time compatible with transponder signals, i.e., in about half of the 0.45 $\mu$sec duration of the transponder pulses.

The circuit to supply current to turn the diode on must not interfere with the operation of the system by affecting the characteristics of the electromagnetic components of the antenna array and the quarter-wave lines. This is the reason for providing the open quarter-wave line 58. The anode of the diode 67 is connected to one end of the open line 58 and the cathode of the diode is connected to the parasitic element 28 at one end of the line 57. The high current pulses (which may be as high as 1 amp.) to turn the diode on are supplied by way of a coaxial cable 68 to a pulse amplifier 69 that drives an emitter follower stage 71 connected to one end of the line 58. When that happens, the diode becomes, in effect, a short circuit to one end of the quarter-wave line 58. Since the line 58 is open-circuited at the other end, it acts like a short-circuit to ground for 1090 MHz signals at the end to which the diode is connected. Thus, supplying a current pulse of sufficient magnitude to the diode causes it to connect the parasitic element 28 effectively to ground at the 1090 MHz operating frequency.

In order to provide the pilot with information as to which direction to look for the aircraft transmitting a transponder signal, the system in FIG. 1 has to receive a first part of that signal with the antenna array in one mode, i.e., the omnidirectional mode, so that the system can measure the amplitude of the signal in that mode. Assuming that the antenna array is that shown in FIG. 2, it then has to be changed over to a second mode, i.e., the directional mode, by effectively short-circuiting the base of the parasitic element 28 to ground at the proper time to receive another part of the transponder signal from the same aircraft so that the system in FIG. 1 can measure the amplitude of that signal. These amplitudes then have to be compared. It is essential that both measurements be made on signals from the same source, and it is desirable to eliminate as many extraneous signals, or noise, as possible. There are several ways to be sure that the second signal measured is from the same source as the first signal.

Figure 9:
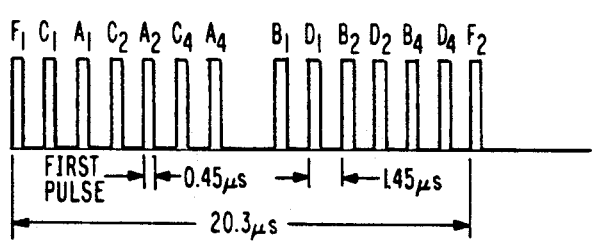
FIG. 9 shows the idealized waveform of a pulse signal containing both framing pulses and all twelve of the encoding pulses that can be transmitted by a transponder and received in the apparatus of FIG. 1.

One way is to make use of the known timing incorporated in transponder signals, which are shown in idealized form in FIG. 9. Transponder signals always include two framing pulses F1 and F2, the leading edges of which are 20.3 μsec apart, and between the framing pulses, up to twelve encoding pulses, or bits, arranged in four three-bit interleaved groups A–D, with the suffixes 1–3 of the three bits within each group indicating the numerical weight of the respective bit. Each pulse can only occur at a specific time in a transponder signal, and the convention is that, if a pulse does occur in a given time slot, it will be treated as a 1 bit, while, if it does not occur, it will be treated as a 0 bit. Each three-bit group can be represented by a single octal-based digit, and the largest octal number that can be presented on the four-digit display devices used on transponders is 7777, which corresponds to the decimal number 4096. The pulses are designated, in order: C1, A1, C2, A2, C4, A4, B1, D1, B2, D2, B4, D4. Each pulse, including each of the framing pulses, has a duration of 0.45 μsec, and the pulses are located in time slots that begin 1.45 μsec apart, except that there is no pulse in the present SSR system in the time slot between the sixth and seventh encoding pulses A4 and B1.

Within the 20.3 μsec interval between the leading edges of the framing pulses F1 and F2, the distance between the pilot's aircraft and the other aircraft will not changed measurably, which assures that the amplitude of the received framing pulses of a single group will not be affected by relative movement of the aircraft. The fact that the framing pulses are so close together in time also makes it extremely unlikely that transponder signals from a third aircraft could occur at such a time as to form a misleading signal. Even if that happened, aircraft do not stand still, and by the time the measurements were repeated at the next rotation of the SSR ground station antenna sending out the interrogating signals, the third aircraft would not be in the same position relative to the pilot's aircraft and the other aircraft.

Since both framing pulses are transmitted by the transponder in response to every interrogation, they may be used in forming the ratio to indicate the direction from the pilot's aircraft to the other aircraft. Using the apparatus in FIGS. 7 and 8, for example, the diode 67 can be kept non-conductive so that the array consisting of the elements 27 and 28 will be in its omnidirectional mode until a first pulse is received at the proper 1090 MHz frequency. The amplitude of that pulse can be measured and stored, and timing means can be actuated to cause a sufficient current pulse to be supplied to the diode 67 20.3 μsec later to cause the antenna array to switch over to its directional mode just in time to receive the second framing pulse F2.

Figure 10:
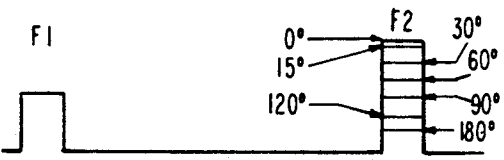
FIG. 10 shows only the framing pulses of the signal in FIG. 9 with the amplitude of the second framing pulse modified by the antenna system operating in its directional mode.

FIG. 10 shows the two framing pulses F1 and F2 without any other pulses between them. There is virtually always at least one encoding pulse between them, but the encoding pulses have been blocked out in FIG. 10. The amplitude of the pulse F2 can then be measured and compared with the stored amplitude of the first framing pulse F1 by forming a ratio of the amplitudes. This ratio can then be compared to a stored table of ratios to find the ratio that matches best. The angle corresponding to that ratio must then be made known to the pilot as the direction in which to look for another aircraft. Levels are indicated on the pulse F2 to correspond to the bearing angles from the pilot's aircraft to other aircraft.

As an alternative to changing the operating mode of the antenna array for the duration of the second framing pulse, the speed of operation of a fast diode 67 in FIG. 8 makes it possible to change the mode at the end of approximately the first half of the 0.45 μsec duration of the first framing pulse F1 or any other pulse in the transponder signal. However, this requires that the waveform of the pulses be taken into account. Transponder pulses do not have the precise configurations of the idealized pulses shown in FIG. 9. They are somewhat trapezoidal in shape, with a finite rise time specified to be from 0.05 to 0.1 μsec and a longer decay time that can be from 0.05 to 0.2 μsec.

Figure 11A:
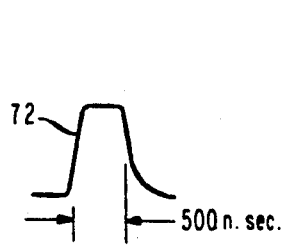
FIGS. 11a–11c show waveforms of a typical one of the pulses in FIG. 9 with the antenna system switched from its omnidirectional mode to its directional mode within the time interval between the leading and trailing edges of one of the pulses.

FIG. 11a shows the waveform of a typical transponder pulse 72, which could be either of the framing pulses or any one of the twelve encoding pulses, as received by the antenna array 21 in FIGS. 7 and 8 when the array is operating in its omnidirectional mode. The pulse 72 has a short rise time of about 0.05 μsec, a top that remains relatively flat for almost 0.5 μsec, and a trailing edge that takes about 1 μsec to decay. The decay time is longer than the specified value because of the time constant in the detector circuit.

Figure 11B:
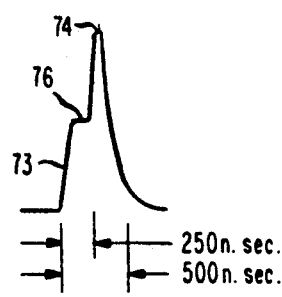

FIG. 11b shows a similar pulse 73 modified by having the diode 67 made conductive approximately 0.25 μsec after the start of the pulse and while the antenna array 21 was receiving the pulse from a source directly ahead, i.e., in the 0° location. As may be seen, the amplitude of the pulse jumps sharply to a higher level 74 about midway through the flat part 76 due to the sudden change of the antenna array from its omnidirectional mode to its directional mode when the diode 67 is made conductive. The ratio of the amplitude just after the change in mode to the amplitude just prior to that is about 2:1, and it is this ratio, previously stored in memory, that can be used to indicate that the source of the pulse is directly ahead of the antenna array 21.

Figure 11C:
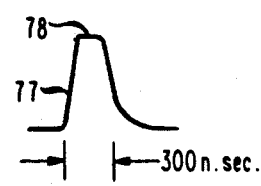

FIG. 11c shows a similar pulse 77 which is also modified by having the diode 67 in FIG. 2 made conductive approximately 0.25 μsec after the start of the pulse but with the source located in the 180° position. The first part 78 of the pulse 77, when the antenna array 21 by which it is being received is in its omnidirectional mode, is the same as the first part 76 of the pulse 73 in FIG.

11b, but when the array 21 is made directive, the amplitude falls due to the fact that signals from behind the pilot's aircraft are received less well than in the omnidirectional mode. The sloping back part of the pulse 77 obscures that fact and makes it difficult to compute the correct ratio, which would be less than 1.00. This is the advantage of changing the mode of operation of the antenna array for the entire framing pulse F2, as described in connection with FIG. 10, instead of for only the last half of a single pulse. It is easier to detect any reduction in amplitude, if it affects the entire pulse than if it affects only the last half. This permits sufficiently accurate calculations of bearing angles to be made based on signals received from aircraft more or less behind the pilot's aircraft, if the technique represented in FIG. 10 is used. However, by using an antenna arrangement such as the array 33 in FIG. 3, the measurement in each of the four quadrants is made using the forward part of the directional pattern (lobe 30 in FIG. 2), and it is never necessary to use the rear part of the directional pattern.

FIGS. 12A-12E show a series of relatively realistic transponder pulses as they would appear on the screen of an oscilloscope if the oscilloscope were installed in the instrument panel of the pilot's aircraft. Adjacent each screen is a number indicating the ratio, obtained from actual measurements, of the height of the uppermost part of the pulse on that screen divided by the height of the flat, first part of the pulse. Also adjacent each screen is a drawing of one or two aircraft in the angular location it or they would have to occupy to produce the pulse on that screen and the ratio alongside the screen.

FIG. 12A shows an oscilloscope screen 79 on which there is a pulse 80 that has a peak 81, the value of which is almost twice as high as that of the flat part 82. The ratio is 1.88, only a little less than the maximum value of 2.0, and it is produced by an aircraft 83 directly ahead of the pilot's aircraft. Within the limit of linear operation of the system in the pilot's aircraft, which will be discussed in greater detail later, it does not matter how far the other aircraft 83 is from the pilot's aircraft. The height of both the peak 81 and the flat part 82 will decrease with increasing distance, but the ratio will remain the same as long as the other aircraft remains directly ahead of the pilot's aircraft, i.e., in the 0° position relative to it.

FIG. 12B shows that the ratio is noticeably affected by displacement of the other aircraft from the 0° position. If the aircraft 83 moves 15° to the right, the ratio drops to about 1.63. FIG. 12B also shows that if the other aircraft is 15° to the left, as indicated by another aircraft 84, the ratio will also be 1.63. This is due to the symmetry of the pattern 30 in FIG. 2. Even without knowing whether another aircraft is in the position of the aircraft 83 or in the position of the aircraft 84, calling attention to the fact that there is another aircraft in at least one of those positions allows the pilot to concentrate on those two areas and to be much more likely to sight the other aircraft than if it were necessary to search the entire sky for that aircraft.

FIG. 12C shows that the ratio drops to 1.38 if the other aircraft 83 is 30° to the right or is in the location of the aircraft 84 30° to the left, and FIG. 12D shows that the ratio drops still further to 1.08 if the other aircraft is either 60° to the right or 60° to the left.

If the other aircraft 83 and 84 are substantially alongside the pilot's aircraft, i.e., are in the +90° position or the −90° position the ratio drops to 1.00, as shown in FIG. 12E. The ratio drops below 1.00 if the other aircraft are farther aft than the +90° or −90° positions, but, as shown in FIG. 11c, the ratio is difficult to measure when the change in directivity is instituted in the middle of one of the 0.45 μsec pulses. Even if the change in directivity is instituted for the entire framing pulse, as shown in FIG. 10, the ratios produced by pulses received from the rear do not have as wide a range of values as the ratios produced by pulses received from a forward direction. Signals received from the rear are not unimportant, though. A commercial jet overtaking a private aircraft at the same, or a closing, altitude and maintaining a fixed bearing with respect to the private aircraft will produce as devastating a midair collision as if the two aircraft were approaching each other head on.

One of the advantages of changing the directivity of the antenna array in the middle of one of the received pulses is that it is possible to calculate, upon receiving the very first pulse, a ratio from which to get at least some idea of the direction in which to look for the other aircraft. Since there are always at least the two framing pulses in every identification response and in every altitude response, along with at least two encoding pulses in every altitude response above −700′, which is a theoretically possible flying level because of the use of the standard barometric reading of 29.92″ of mercury, the use of one of the arrays in FIG. 3 or FIG. 4 or FIG. 5 makes it possible to determine, with good accuracy and based on each group of pulses received as the beam from the ground station interrogates the other aircraft, the direction in which to look for that aircraft. Even if the standards are changed so that an altitude response can be recognized by itself, for example, by inserting a pulse in the interval presently unused between the time slots for the pulses A4 and B1 (FIG. 9), there will be at least the two framing pulses and two encoding pulses on which to base four separate ratio measurements by changing the directivity of the antenna array in the middle of each of the four pulses.

In FIG. 13, two elements 86 and 87, each similar to the element 27 in FIGS. 7 and 8 and spaced about $\lambda/8 \pm \lambda/16$ apart, are connected to a circuit that allows either of the elements 86 or 87 to be operated as the antenna or the parasitic element. The elements are soldered or otherwise suitably conductively connected to one end of quarter-wave strip transmission lines 88 and 89, respectively, which are defined by slots 91 and 92 in a conductive layer 93 on one side of a printed-circuit board 94. These slots also define two other quarter-wave lines 96 and 97. One end of each of the lines 88 and 89 joins the conductive layer 93, but the lines 96 and 97 are entirely isolated from the conductive layer. A fragment of the printed circuit board 94 is broken away to show a conductive ground plane 98 on the opposite surface of the board, and the lines 88 and 89 are short-circuited to the conductive ground plane by means of connectors 99 and 101 similar to the connectors 62 and 63 in FIGS. 7 and 8.

A buffer amplifier 102 connects the element 86 to a coaxial transmission line 103 that carries the received signal to the rest of the system when the element 86 is serving as an antenna and the element 87 as a parasitic element. In a similar manner, a buffer amplifier 104 connects the element 87 to a transmission line 106 that carries the received signal to the rest of the system when the element 87 is serving as an antenna and the element 86 is a parasitic element. Diodes 107 and 108 connect the elements 86 and 87 to one end of the lines 96 and 97, respectively. These diodes correspond to the diode 67 in FIG. 8 and short-circuit the base of one or the other of the elements 86 or 87 to its respective line 96 or 97, depending on which of the elements is to serve as a parasitic element and which is to serve as the antenna. The diodes 107 and 108 are controlled by pulses transmitted from the control section of the system over coax transmission lines 109 and 111 and amplified by pulse amplifiers 112 and 113, respectively. The last stage of the amplifier 112 is an emitter follower 114 connected to the anode of the diode 107, while the amplifier 113 also has a final emitter follower stage 116 connected to the anode of the diode 108.

The circuit in FIG. 13 is, in effect, two of the circuits in FIG. 8. This permits the lobe of enhanced directivity, which is the same as the lobe 30 in FIG. 2, to be directed in one direction or the opposite direction. These directions can be either the forward and aft directions of the aircraft or the left and right directions. By using two circuits of the type shown in FIG. 13, all four directions can be covered as effectively as can be done with the five elements in the array in FIG. 3. In fact, full four-direction coverage can be obtained using the two elements 86 and 87, arranged in the circuit shown in FIG. 13, and a third element spaced approximately $\lambda/8$ from one of them in a direction through that element and perpendicular to the straight line from element 86 to the element 87.

Thus far the description of this invention has been directed primarily to the detection of the bearing angle from the pilot's aircraft to another aircraft. However, that information, alone, is not sufficient to justify alerting the pilot to the presence of the other aircraft. It is also important to know that the other aircraft is at, or close to, the same altitude as the pilot's aircraft. In terminal areas, where aircraft taking off and landing may be changing altitude quickly, it may be desirable to be aware of other aircraft relatively far above or below the altitude of the pilot's aircraft but closing toward that altitude.

Figure 14:
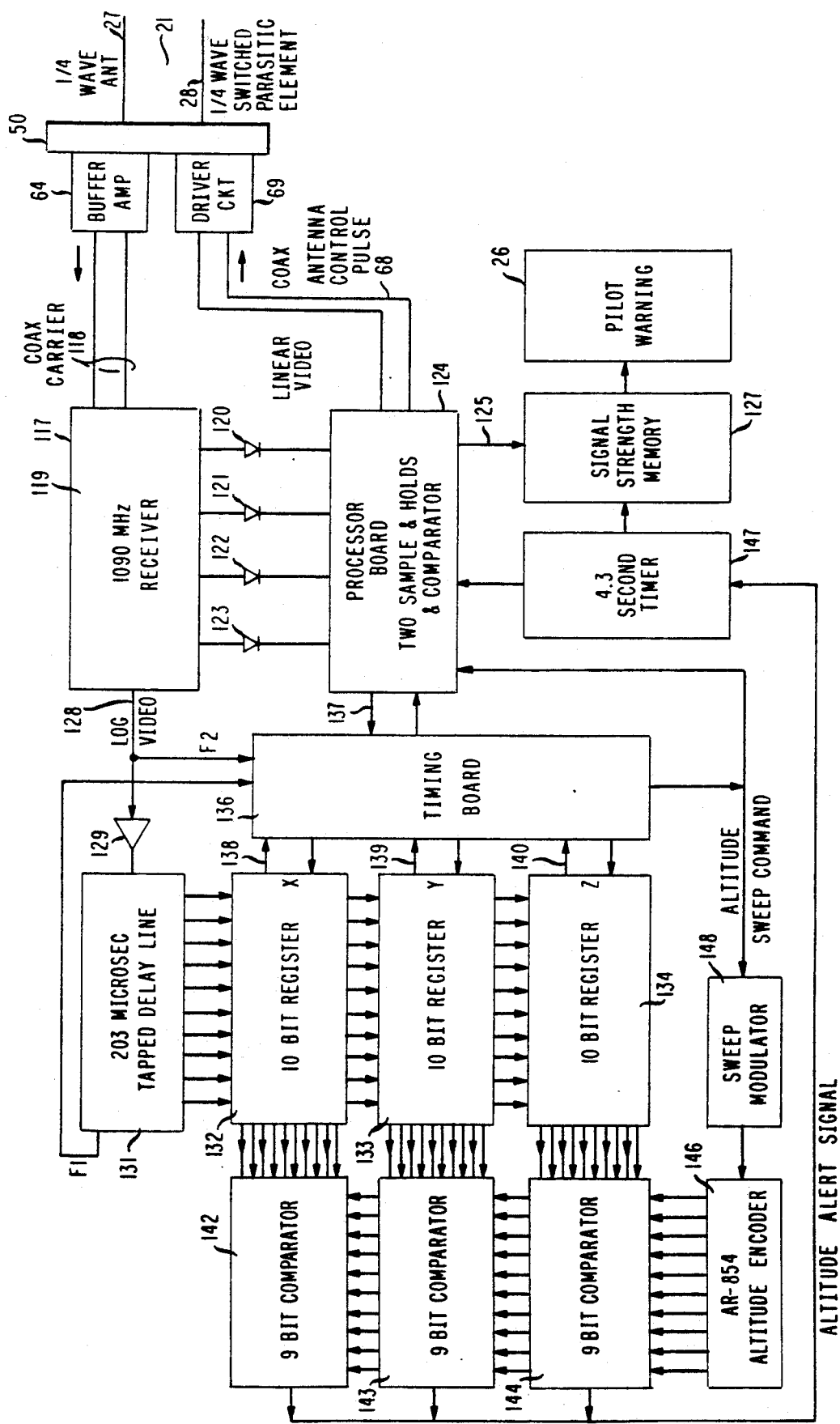
FIG. 14 is a block diagram of a system for analyzing transponder signals in accordance with this invention.

FIG. 14 is a block diagram of a collision warning system based on the system presented in general form in FIG. 1. The antenna array 21 includes the antenna element 27 and the parasitic element 28 mounted on a support, such as the printed circuit board 50. The p.c. board, in turn, is mounted on the structure of an aircraft, which is not shown here but which may be similar to the single-engine aircraft 32 in FIG. 3, although the system can be used on aircraft of all sizes and types. A buffer amplifier 64 located close to the antenna passes signals on to the r.f. section 117 of a receiver by means of a coaxial transmission line 118. This part of the receiver includes a mixer to convert the 1090 MHz transponder r.f. signals from the buffer amplifier to intermediate frequency signals, normally at 60 MHz, to be amplified in a multistage intermediate frequency amplifier 119 that has a logarithmic characteristic, such as is typical of transponder receivers.

The i.f. amplifier has separate output terminals from at least several of its stages, if not all of them, and linear detectors 120–123 are connected to four such i.f. output terminals. All of these detectors are connected to a processing circuit 124 that sends a control signal in the form of a single pulse by way of the coaxial line 68 to the driver circuit, or current pulse amplifier 69 in FIG. 8, to control the directivity of the antenna array 21 by grounding the base of the parasitic element 28.

An output terminal 125 of the processing circuit 124 is connected to a memory 127 capable of storing one or more of several types of information that can be derived from a received transponder signal, such as the strength of the incoming signal and the identification and altitude codes of the other aircraft. The strength of the incoming signal and the altitude code can not only be used to indicate the proximity, bearing, and altitude of the other aircraft at the time of reception, but by storing those signals in association with the identification code and comparing the stored signals with corresponding signals received on the next interrogation of the same aircraft, the system can determine whether that particular aircraft is getting closer, staying at the same distance, or getting farther away, and whether or not it is approaching the altitude of the pilot's aircraft or is remaining at or departing from a dangerously close altitude. The storage of information also allows the pilot to be informed of any significant change in the relative direction of the other plane from the pilot's plane and, particularly, to be informed if that relative direction does not change. The combination of these items of information allows the form and urgency of any warning presented to the pilot by the display means 26 to be tailored according to the degree and change of danger of a collision with that other aircraft.

In addition to having separate outputs from each of its stages, the i.f. amplifier 119 includes a final detector with a video output terminal 128. The transponder signals from the final detector are connected to an amplifier 129 that passes them along to pulse-separating means 131. In this embodiment, the pulse-separating means is shown as a tapped 20.3 $\mu$sec delay line to separate the framing pulses and the individual encoding pulses, but it is well known that a series of specifically timed pulses, such as transponder pulses, can be separated by suitable pulse circuits, such as digital computer circuits. For simplicity, FIG. 14 will be described with the assumption that the pulse-separating means 131 is a delay line.

The 20.3 $\mu$sec delay is precisely the right length of time to permit the framing pulse F1 to be obtained from the far end of the delay line at the same 0.45 $\mu$sec interval the second framing pulse F2 of the same pulse group is being presented to the input end of the line. Only a transponder signal would be likely to include two pulses spaced 20.3 $\mu$sec apart, and the failure to receive a second pulse at the expected time of the second framing pulse F2 could prevent false operation of parts of the system. There are already in use certain techniques to distinguish transponder signals from extraneous signals by determining the length of each pulse. The coincidence circuit in this invention provides a useful additional means of confirming that the signals are from a transponder.

Between the two ends of the line are taps for output terminals suitably spaced to allow at least the altitude-encoding pulses to be extracted at the same time as the two framing pulses. This only requires taps for nine possible altitude pulses (excluding pulses in group D in FIG. 9) for operation up to 30,800', but the separating means can also retrieve the three possible pulses in group D by simply providing three more taps. While not necessary for comparing three pulse groups to find out which represents the altitude, this can aid in distinguishing identification signals from altitude signals, thus facilitating analysis of the current traffic condition and changes in the arrangement of traffic in the vicinity of the pilot's aircraft, and it can also specifically identify the other aircraft for queries to the ground station.

The output terminals from the delay line 131 for the encoding pulses are connected to memory means in the form of three storage registers 132-134 in this embodiment. A timing circuit 136 is connected to the output terminal 128 of the main part 117 of the receiver and to an output terminal 137 of the processing circuit 124. The timing circuit has clock signal output terminals 138-140 connected to the enabling terminals of the respective storage registers 132-134. Each bit circuit of each of the storage registers has an output terminal connected to a corresponding bit-comparison input terminal of one of three comparators 142-144. An altitude-code generating circuit 146 capable of generating the code corresponding to the altitude of the pilot's aircraft has separate output terminals connected to each bit-comparison circuit in each of the comparators 142-144, and a sweep modulator 148 controlled by signals from the timing circuit 136 is connected to the code-generating circuit 146. The comparators have output circuits connected back to the processing circuit 124 and to the memory 127 by way of a timer circuit 147 in this embodiment.

Operation of the system illustrated in FIG. 14 will be described on the basis that a fast-acting diode is used to change the directivity of the antenna array 21 in real time during the second half of one of the 0.45 μsec transponder pulses.

When a first pulse of the proper carrier frequency is received with the antenna array in its omnidirectional mode, the signal is amplified by the buffer amplifier 64, and transmitted to the r.f. section 117 of the receiver by way of the coax line 118. It is standard practice in transponder receivers to use a logarithmic-type response to prevent overload by signals of widely different field strengths that can arrive too nearly simultaneously for an a.g.c. circuit to handle. However, to calculate the bearing angle of the source in accordance with this invention, it is necessary to have the processing circuit 124 receive signals that have not been distorted but have been processed linearly by circuits between the antenna and the processing circuit. Linear operation is also required if the incoming signals are to be properly analyzed for determining the proximity of the source to the pilot's aircraft.

The present embodiment has linear detectors 120-123 at four successive stages of the i.f. amplifier to provide signals that are still linearly related to various levels of the received signal. Means may be provided within the processing circuit 124 to select, from the proper linear detector, signals of an amplitude high enough to actuate further circuits in the system, yet not so high as to have been subjected to distortion of the type caused by logarithmic amplification. The processing circuit uses the first received pulse to generate a delayed pulse sent via the line 68 to the driver circuit 69 to actuate a high-speed diode to connect the base of the parasitic element 28 to the conductive ground plane 51, as was described in connection with FIGS. 7 and 8. The total delay of the pulse at the diode is about 0.25-0.28 μsec, part of which is in the line 68, thus limiting the maximum length of that line. Conductivity of the diode changes the directivity of the array 21, and causes the amplitude of the remainder of that first pulse to be changed by an amount that depends on the bearing angle from the pilot's aircraft to the other aircraft, as indicated in FIGS. 12A-12E. The signal thus changed passes through the appropriate linear detector within the group 120-123 and causes the processing circuit 124 to generate a ratio signal that represents the amplitude of the first part of the received signal to the amplitude of the part immediately following the change in directivity. If the source is somewhat ahead of the pilot's aircraft, the ratio signal can be used to generate a warning signal that can be made known to the pilot by way of the display means 26 (assuming that the relative altitude and, preferably, the proximity have been checked).

However, the ratio signal, at this point, still has the ambiguity illustrated in FIGS. 12B-12E, and a signal based on preferential directivity in another direction must be processed to generate a second ratio signal to identify whether the other aircraft is in the position of aircraft 83 or 84 in FIGS. 12B-12E. If the ratio of the signal processed first is less than 1.0, indicating that the other aircraft is more or less to the rear of the pilot's aircraft, a third and, possibly, a fourth ratio will be required to determine the bearing angle. This can be done using the separate antenna arrays in FIG. 6 or the multi-element array 33 in FIG. 3, for example. While entirely separate systems may be used to obtain two or more ratios simultaneously, successive groups of transponder signals are only about 2500 μsec apart, and the system in FIG. 14 can be used to generate each ratio in sequence, using separate parasitic element drivers and switching means to correlate the driver with the ratio.

The amplitude of the incoming signal can also be processed to give an approximate distance warning, if desired, and both the relative bearing angle information and the proximity information can be stored in the memory 127 to be compared with signals received later from the same source to determine if that source is getting closer or farther away and if it is maintaining the same relative bearing with respect to the pilot's aircraft or is changing that angle. Furthermore, it is preferable that the pilot not be warned if there is no danger from it, or at least, no immediate danger, because the other aircraft from which the transponder signals are coming is so far away or at a much different altitude or is going away from the pilot's aircraft. On the other hand, if there does appear to be some likelihood that the pilot's aircraft and the other aircraft are heading toward a common point and are at altitudes within about ±500' of each other, the pilot should be given some notice of the circumstance, and that notice should get progressively more urgent as the two aircraft converge.

The incoming transponder signal will continue to be received after the change in directivity that only lasts for the latter part of the first received pulse, and all of encoding pulses received, whether for the identification signal or the amplitude signal, will be applied through the amplifier 129 to the pulse-separating means 131.

The pulses at the various taps in the delay line are applied to the means for analyzing them, and in this embodiment, that consists of the three storage registers 132-134, each of which has enough bit-storage circuits to store each of the nine bits of the altitude signals. Only one of the storage registers at a time is allowed to store the bit code from the delay line 131. This is accomplished by the timing circuit 136, which also receives signals from the output terminal 128 of the i.f. amplifier 119, the delay line 131, and the output terminal 137 of the processing circuit 124. The signals from the terminal 128 constitute all of the transponder pulse signals, including both the framing pulses and the encoding pulses, and are frequently referred to as a video signal because they occupy a relatively wide band, comparable to the band of frequencies required for a television signal. The connection from the far end of the delay line supplies the delayed framing pulse F1 to the timing circuit 136 at the same time the terminal 128 supplies the second framing pulse F2, and the processing circuit 124 supplies a starting signal that resets the timing circuit after every third set of pulse groups from a given aircraft that may be dangerously near the pilot's aircraft.

Only one of the output terminals 138-140 of the timing circuit 136 is energized at a time to allow one of the pulse code signals comprising at least groups A-C from a transponder signal to be recorded in the storage register controlled by the energized output terminal. The first set of three groups is recorded in the storage register 132, which is referred to as the X register. Approximately 2.5 msec later, when the next pair of framing pulses provide coinciding signals to the timing board, a signal from output terminal 139 opens the storage register 133, the Y register, to record the next set of three groups of transponder encoding pulses, and another 2.5 msec later, a signal from the terminal 140 at the occurence of the next pair of framing pulses opens the Z storage register 134 to receive the third group of encoding signals.

The code group stored in one of the registers 132-134 is the altitude code, but it is not possible to tell which one without comparing the groups stored in the registers with each other. Two of them are identification codes (or pulses in groups A-C thereof), and the other is the code representing the altitude of the other aircraft.

In order to tell whether the altitude of the other aircraft is close to that of the pilot's aircraft, a signal corresponding to the code for the altitude of the pilot's aircraft must be compared with the code in the proper one of X, Y, and Z registers. However, the code generated by the circuit 146 in the pilot's aircraft or the code generated in the altitude encoder of the other aircraft may be inaccurate. The SSR system takes possible inaccuracies into account by operating on the basis that an aircraft might be anywhere within ±500' of the altitude represented by the code its transponder is transmitting. With this in mind, this invention provides for comparison of all altitudes (at 100' intervals) within ±500' of the pilot's aircraft, although other ranges could be used.

One way to provide these eleven codes corresponding to every 100' level from 500' above the altitude of the pilot's aircraft to 500' below it is to use an altitude encoder 146, such as the Narco Model AR-850 altitude encoder, and modulate its encoding circuit to cause it to generate each 100' code within the total 1000' range of interest. This modulation takes about one second. As each of the eleven code groups is thus generated, it is compared with the altitude code stored in the registers X, Y, and Z. Since the altitude code from the other aircraft may be stored in any one of these three registers, the output bit terminals of the modulated encoder are connected to bit-comparison terminals on all three of the comparators 142-144 in parallel. The comparators can be controlled so that only one will be referenced at a time to see if any match is made with any of the eleven codes.

One way to determine which storage register is the correct one is to compare the code stored in one of the storage registers, say the X register with the code stored in one of the others, say the Y register. If they match, the third one, Z, is the one in which the altitude code is stored. If the codes stored in the registers X and Y do not match, the code stored in one of them, say register X needs to be matched with the code stored in the third register Z. If codes in registers X and Z do not match, the altitude code must be that stored in register X. If they do match, the altitude code is that stored in register Y.

If any one of the eleven altitude codes generated by the modulated encoder 146 matches, a signal is sent from the appropriate comparator 142, 143, or 144 to the memory 127 and on to the pilot display means 26. This signal includes a warning that there is another aircraft at an altitude within 500' of the altitude of the pilot's aircraft and tells the pilot in which direction to look to find the other aircraft. The warning display 26 can also indicate whether the other aircraft is above, level with, or below the pilot's, making it even easier to spot. In addition, the storage means 127 can be queried about once every 4.3 sec by signals from a timer 147 to compare the stored value of the signal strength with the next measured signal strength value to determine whether the other aircraft is getting farther away or closer, and if the latter, how quickly. The warning can be made more urgent if the other aircraft is within a certain distance and altitude range and, especially, if it is getting closer. The 4.3 sec interval is the time taken for the antenna at the ground station to make a revolution and be in a position to send out the next set of interrogating signals.

Instead of causing the altitude encoder 146 to sweep through the eleven sets of altitude codes after a transponder signal has been received from the other aircraft, the processing circuit can include means to generate electronically the eleven sets of signals and to store them at all times. The encoder 146 can keep track of the altitude of the pilot's aircraft and the eleven codes can be updated with any change in altitude of 100' or more. The eleven relevant altitude signals could thus be ready for almost instantaneous comparison with a received altitude signal. Each of the eleven signals could be stored in a separate comparator or could be available for electronic interrogation, which could be completed much more rapidly than the time required to modulate the encoder 146 through the required range.

FIG. 14 shows only a two-element antenna array consisting of the antenna 27 and the parasitic element 28. As has been stated, this provides ambiguous information in that it does not tell the pilot whether the other aircraft is off to the right or the left. The array 33 in FIG. 3 is capable of providing information on the relative bearing angle of aircraft at any location around the pilot's aircraft by simply grounding one of the parasitic elements 35-38 at a time in sequence. This could be done by providing a separate driver 69 for each parasitic element and controlling each driver by repetitive sequencing switch means. The framing pulses F1 and F2 of two successive sets of incoming code groups could be used, or, as indicated in connection with FIG. 10, the framing pulses of four code groups could be used. Since almost every altitude code includes at least two encoding pulses, in addition to the two framing pulses, it is possible to use the first four pulses, whether framing or encoding pulses, as the ones within which the directivity of the array 33 is to be changed for an instant.

It is also possible to provide four separate pairs of elements like 27 and 28, but aligned in the four directions and actuate the driver, similar to the driver 69, for each parasitic element simultaneously to generate four ratios at once. Determining the bearing angle in all four directions at once would not only make it possible to calculate accurately and virtually instantaneously the relative bearing angle of the other aircraft from the pilot's aircraft around the entire 360° but would assure that the transponder signal being received by all of the r.f. sections would be the same one. This would require four r.f. sections and mixers, like the section 117, and four i.f. amplifiers, like the amplifier 119, but a single local oscillator could serve all four mixers. The local oscillator in a transponder has to be held at a very precise frequency, and this makes it more expensive than other parts of the circuit, such as the i.f. amplifier 119. Using one oscillator to serve as the local oscillator for four mixers would make such a system substantially less expensive than having to provide a separate local oscillator for each.

Figure 15:
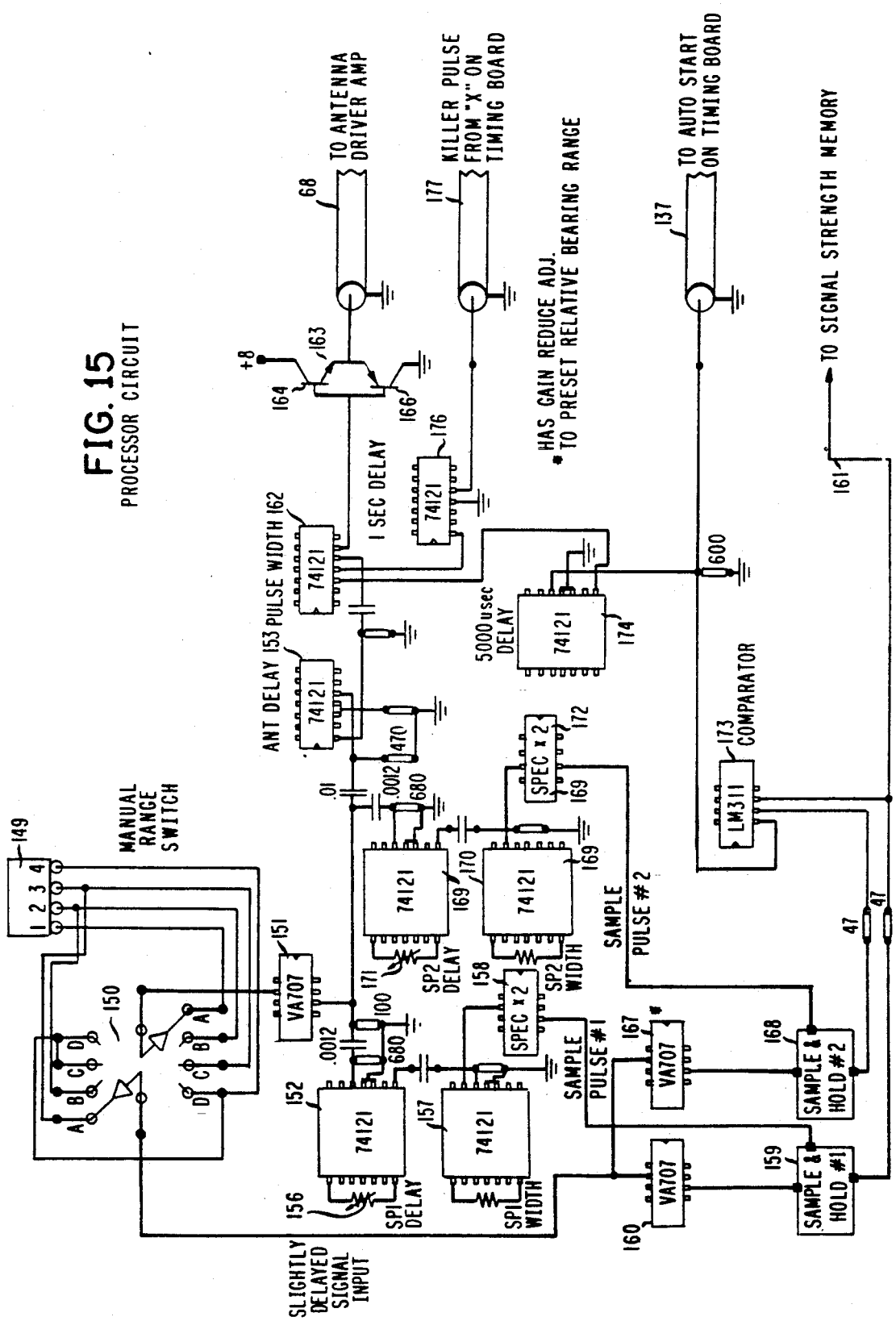
FIG. 15 is a schematic circuit diagram of a processor circuit suitable for use in the system of FIG. 14.

FIG. 15 shows an embodiment of the processor circuit 124 in greater detail. It includes connector means 149 for connecting to all four of the linear detectors 120–123 in FIG. 14 simultaneously. The connector is connected to a switch 150, which is illustrated as the equivalent of a two-arm, four-position, switch. The purpose of the switch is to allow selection of a transponder signal that has been amplified to the proper level but not to a level high enough to reach the non-linear range of the i.f. amplifier 119. The first arm makes contact with terminals 1, 2, 3, and 4 of the means 149 at the same time the second arm is making contact with terminals 2, 3, 4, and 4, respectively. These terminals 1, 2, 3, and 4 indicate connections to the detectors 120, 121, 122, and 123, respectively, in FIG. 14.

The signal of the proper level could be selected by using a manually operated switch as the switch 150, but there are alternative arrangements that could be used instead. For example, the switch 150 can be an electronic switch with means to sense the proper signal level. Alternatively, several pairs of identical processor channels could be connected to the linear detectors 120–123 in FIG. 14, each such channel being connected to a specific detector, or pair of detectors. The system could then be arranged to utilize the proper one of those channels having a sufficient, linearly amplified, output signal.

With the two arms of the switch 150 in the positions shown, the first arm connects the terminal 1 to a video, or relatively wide band, op amp 151. This op amp supplies triggering signals to several one-shots 152, 153, and 154. The one-shot 152 includes a variable resistor 156 to control the length of the pulse, which is preferably about 0.15 μsec long and is used to trigger another one-shot 157 to generate a sampling pulse about 0.04 μsec long at a time within the first half of the flat part at the peak of the incoming 0.45 μsec pulse. The output of the one-shot 157 is connected to an op amp 158 that supplies the pulse signal to the sampling input terminal of a high-speed sample-and-hold circuit 159.

The signal to be sampled in the circuit 159 is obtained from the second arm of the range switch 150, which is supplied by way of the second terminal of the connector means 149 from one the linear detectors 120–123 in FIG. 14. Preferably, the second arm of the switch 150 is connected to the next linear detector downstream from the detector connected to the first arm of the switch 150, except at the highest level. There is a short delay in passing through the extra i.f. stage, so that the signal connected from the second arm of the switch to an op amp 160 is slightly delayed relative to the signal applied to the op amp 151, except at the highest level. The op amp 160 amplifies this slightly delayed signal and applies it to the sampling circuit 159, where it is sampled by the 0.04 μsec pulse from the op amp 158.

All of this takes place within about the first half of one of the 0.45 μsec transponder pulses.

Signals representative of the sampled value of the signal from the op amp 160 while the antenna is in its omnidirectional mode are obtained from the sample-and-hold circuit 159 and connected to a line 161 leading to means to measure the signal strength of the incoming signal during the first half of one of the 0.45 μsec pulses. Such a measuring circuit can be part of the signal strength memory circuit 127 in FIG. 14, which would allow the strength of the signal from the other aircraft to be measured as it was being received and then later compared with subsequently received signals from the same aircraft to determine whether that aircraft was getting closer to or farther from the pilot's aircraft.

At the same time that the op amp 151 applies the triggering signal to the one-shot 152, it also applies a triggering pulse to the one-shot 153 to generate a pulse approximately 0.25 μsec long to be applied as the triggering pulse for another one-shot 162. This one-shot generates the pulse that switches the mode of the antenna array from omnidirectional to directional approximately 0.25–0.28 μsec after the leading edge of the incoming 0.45 μsec pulse.

The output pulse signal from the one-shot 162 is applied to a matching circuit 163 comprising an NPN transistor 164 and a PNP transistor 166. The emitter circuits of these transistors are connected in series between the positive power supply terminal of the system and ground, and the bases of both transistors are connected to the Q output terminal of the one-shot 162. The common junction between the emitters of these transistors is connected to the center conductor of the coaxial line 68 shown in FIG. 8 as being connected to the driver circuit 69 that drives the diode 67 to conductivity.

The signal applied to the op amp 160 is also applied to an op amp 167, which is of a similar type but has means for controlling its gain to preset the relative bearing range. The output of the op amp 167 is connected to a second high-speed sample-and-hold circuit 168, similar to the circuit 159, as the signal to be sampled therein. The sampling pulse for the circuit 168 is obtained from the op amp 151 by a sampling pulse circuit 169 comprising both the one-shot 154 and a sampling pulse generator 170. This circuit is similar in configuration to the circuit that generates the sampling signal for the first sample-and-hold circuit 159, except that the one-shot 154 generates a longer pulse having a duration of about 0.25 μsec and supplies that pulse as the triggering pulse to the one-shot 170 that generates a 0.04 μsec sampling pulse. The circuit of the one-shot 154 includes a variable resistor 171 to control the length of its output pulse, and therefore the delay of the sampling pulse, just like the control 156 in the circuit of the one-shot 152. The pulse from the one-shot 170, delayed by the duration of the pulse produced by the one-shot 154, is applied to an op amp 172 that amplifies it and applies it to the sampling signal input terminal of the second sample-and-hold circuit 168 to sample the voltage level of the incoming pulse during its second half, after the antenna array has had just enough time to switch over to the directional mode.

Although the same signal is supplied to both of the op amps 160 and 167, they are sampled at different times in the respective sample-and-hold circuits 159 and 168, so that there is no confusion between their output signals. These sampled signals are connected to input terminals of a comparator 173 that generates a ratio signal according to the relative bearing angle of the source of the received transponder signal from the pilot's aircraft, and the output signal from the comparator is connected to the timing circuit 136 in FIG. 14 by means of a coax cable 137 to initiate timing operations there.

The output signal of the comparator 173 is also connected to a one-shot 174 to generate a lock-out pulse having a duration of about 5000 μsec when the level of the output signal from the comparator reaches a predetermined value. The purpose of this pulse is to use it to lock out the mode-changing circuit as soon as an incoming signal indicates, by producing a high enough comparison signal from the circuit 173, that there is an aircraft in a potentially dangerous location relative to the pilot's aircraft. To do this, the output of the one-shot 174 is applied to a $A_1$ input circuit of the one-shot 162 to prevent that one-shot from being actuated by the next received pulse, or any other pulse until the end of the 5000 μsec. The reason for choosing approximately 5000 μsec is that that is just long enough to receive three groups of transponder signals, two corresponding to the identification signal and one to the altitude, from the other aircraft. This assumes that the transponder in the other aircraft is being interrogated at the rate of 400 times per second. Sometimes the interrogation rate is a little slower, so the length of the lock-out pulse produced by the one-shot 174 may need to be a little longer than 5000 μsec.

It may also be desirable to interrupt operation of the mode-changing operation of the system for longer than 5000 μsec. In this embodiment, a one-shot 176 set to produce an output pulse having a duration of about 3 seconds is connected to another control terminal, the $A_2$ terminal, of the one-shot 162 to prevent operation of the latter for the duration of a pulse from one-shot 176, independently of the 5000 μsec lock-out signal generated in the one-shot 174. Signals, called killer pulse signals, from the timing circuit 136 in FIG. 14 are transmitted to the one shot 176 by way of another coax cable 177. The origin of those signals will be described in connection with FIG. 16.

Figure 16:
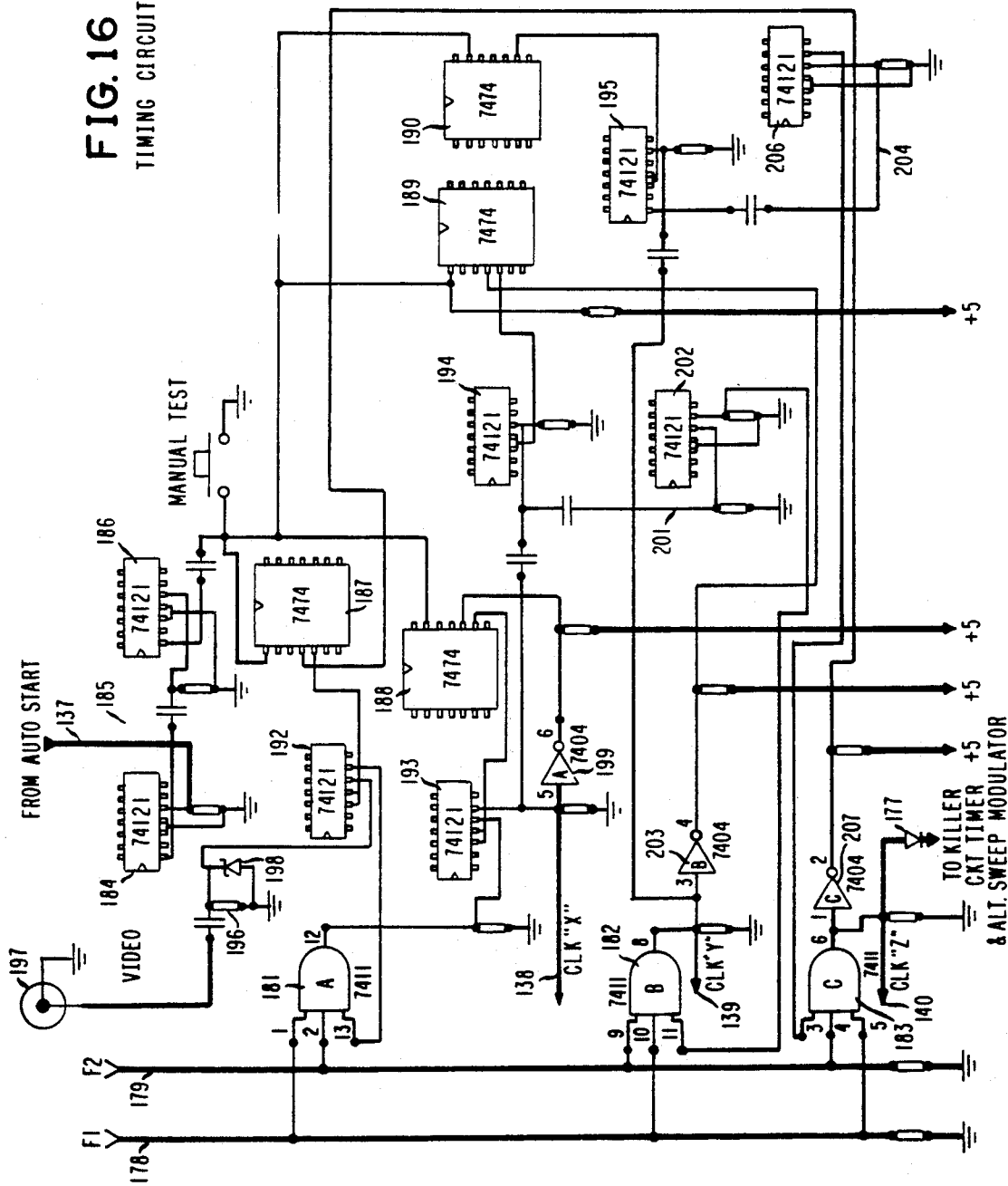
FIG. 16 is a block diagram of a timing circuit suitable for use in the system of FIG. 14.

FIG. 16 shows the timing circuit 136 of FIG. 14 in more detail. These operations begin with simultaneous reception of framing pulses F1 and F2 at input terminals 178 and 179. The terminal 178 is connected to the output of the delay line (or equivalent) 131 in FIG. 14, and the terminal 179 is connected to the video output terminal 128 of the i.f. circuit 119. The terminals 178 and 179 are connected to two input terminals of each of three triple AND gates 181–183, the output terminals of which can only go high if all three of its input terminals are simultaneously high. The first two input terminals of each AND gate will only be high if there is both a first framing pulse F1 and a second framing pulse F2 20.3 μsec after the pulse F1. The third input terminal is used to control the operation so that only one of the AND gates at a time produces an output high, and those highs are in proper sequence.

The sequence will be assumed to start by applying a positive, auto start, pulse signal from the connecting line 137 to a clearing circuit, which includes two one-shots 184 and 186. Specifically, the auto start signal is applied to the B, or triggering, input terminal of the one-shot 184, which causes the $\overline{Q}$ output terminal of that one-shot to go low for about 20 μsec to delay the operation of the one-shot 186. The 20 μsec pulse signal is differentiated and applied to the B input terminal of the one-shot 186, causing its $\overline{Q}$ output terminal to go low at the occurrence of the trailing edge of the pulse from the one-shot 184. When that happens, a clearing signal is applied to force the clearing terminals of four D-type flip-flops 187–190 to go low, which drives the Q terminals of those flip-flops to ground. These Q terminals are connected to the $A_1$ and $A_2$ terminals of four one-shots 192–195, and forcing the latter terminals to ground places those one-shots in condition to be actuated by a positive signal applied to their respective B input terminals.

The first such positive signal is derived from the detected video output terminal 128 of the i.f. amplifier circuit 119 in FIG. 14 and is received into the circuit in FIG. 16 by way of an input circuit 197 that has a terminal 196 connected to the B triggering terminal of the one-shot 192. The signal is applied across a zener diode 198 that keeps the peak value of the input signal from going too high. While every positive pulse in the group received from an incoming transponder signal drives the B terminal of the one-shot 192 positive, the A terminals are held positive until the end of the 20 μsec timing interval of the one-shot 184, so that the one-shot 192 not able to respond before that time. It does so upon receiving the F2 framing pulse by generating a positive pulse at its Q output terminal, which is connected to the third input terminal of the first triple AND gate 181. The other two input terminals of that gate are also positive as a result of receiving the two framing pulses simultaneously, thereby causing the output terminal of the AND gate to go high. This applies a positive pulse to the B terminal of the one-shot 193. The A terminals of that one-shot have already been driven to ground by the flip-flop 188, enabling it to respond to the pulse from the AND gate 181 so as to produce a positive pulse at its Q output terminal. This pulse is applied by way of the output line 138 to the X storage register 132 to enable it to receive any pulses in the A–C groups of the incoming transponder signal stored at that time in the delay line 131.

The output pulse signal from the one-shot 193 is also applied to the B triggering input terminal of the one-shot 194 and, through an inverter 199, to the preset terminal of the flip-flop 188. This pulse signal reverses the state of that flip-flop, causing its Q output terminal to go high, thereby driving the A terminals of the one-shot 193 high. This disables the one-shot 193 and prevents it from being actuated by any further transponder signals received from the input AND gate 181 until those A terminals are again grounded.

Actuation of the one-shot 194 by the output pulse from the one-shot 193 causes the one-shot 194 to generate a pulse having a duration of about 2500 μsec or a little less, depending on the length of time between successive groups of transponder pulses generated in the other aircraft by interrogation from the ground station. The relatively long pulse generated by the one-shot 194 is taken from its $\overline{Q}$ terminal and passed through a differentiating circuit 201 to the B input terminal of a one-shot 202. The trailing edge of the differentiated pulse actuates that one-shot, causing it to generate a positive pulse at its Q output terminal, which is connected to one of the three input terminals of the triple AND gate 182. This pulse has a duration of about 100 μsec, long enough to be sure that it overlaps the next pair of simultaneous framing pulses F1 and F2 applied to the other two input terminals of that AND gate so that the gate can produce a high at its output terminal during the time of coincidence of the three input signals.

The high output signal of the AND gate 182 constitutes the Y clock signal and is connected by the line 139 to the Y storage register 133 in FIG. 14. As in the case of the X clock signal, the Y clock signal enables the Y register 133 in FIG. 14 to receive all of at least the A-C groups of transponder signals then located in the delay line 131. The output voltage of the AND gate 182 is a positive-going pulse and is applied to an inverter 203, which inverts it and passes it along to the present terminal of the flip-flop 189 to reverse the operating state of the latter, thereby driving its Q terminal high. This terminal, being connected to the A terminals of the one-shot 194 high, raises that terminal to a positive level, which prevents that one-shot from responding to any further high signals applied to its B terminal.

The high output level of the AND gate 182 is also applied to the B triggering terminal of the one-shot 195, which initiates the production of a 2500 μsec pulse by that one-shot. This causes the $\bar{Q}$ terminal of the one-shot 195 to drop to zero for the duration of that pulse, at the end of which time, the $\bar{Q}$ terminal returns to its quiescent, high state. The negative-going pulse thus produced at the $\bar{Q}$ terminal is differentiated in a differentiating circuit 204, and the trailing edge of the 2500 μsec pulse causes the trailing edge of that pulse to be applied to the B triggering terminal of a one-shot 206 as a positive, triggering pulse.

Triggering the one-shot 206 by the trailing edge of the 2500 μsec pulse from the one-shot 195 causes the one-shot 206 to initiate the beginning of a positive pulse at its Q output terminal. This pulse has a duration on the order of about 100 μsec and is applied to one of the input terminals of the AND gate 183. During that interval, the third set of framing pulses F1 and F2 arrives at the other two input terminals of the AND gate 183, causing its output terminal to go high. This provides the Z clock signal to be connected to the Z storage register 134 in FIG. 14 by way of the line 140.

It should be noted that the 2500 μsec delay provided by each of the one-shots 194 and 195 is dependent on the repetition rate of interrogations signals from the ground station. This value differs somewhat from station to station, and it may be desirable to provide means to vary the delay controlled by these one-shots so that the AND gates will be enabled only for a short time substantially coincident with the occurrence of the F2 framing pulse and the delayed F1 framing pulse. This minimizes or prevents much of the undesired noise from being able to get through the AND gates. Since the other aircraft of most concern to the pilot in whose aircraft the system of this invention is being used are the closest ones, and they will most likely be under interrogation from the same ground station interrogating the transponder in the pilot's aircraft, it may be desirable to extract information from the pilot's transponder as to the repetition rate and use that to set the delay produced by the one-shots 194 and 195.

The high level at the output terminal of the third AND gate 183 is inverted by an inverter 207 and applied to the preset terminal of the flip-flop 190 to cause that flip-flop to reverse its state of conductivity, thereby causing its Q output terminal to go high. This raises the A terminals of the one-shot 195 to a high level, which renders that one-shot unable to respond to any further high signals applied to its B triggering terminal. The signal applied to the preset terminal of the flip-flop 190 is also applied to the preset terminal of the flip-flop 187, thereby reversing the state of conductivity of that flip-flop. This drives the A terminals of the one-shot 192 low, enabling that one-shot to respond to the next high signal applied to the input terminal 137.

Finally, the high output signal of the third AND gate 183 constitutes the Z clock signal and is connected by the line 140 to the Z storage register in FIG. 14. As in the case of the Y clock signal, the Z clock signal enables the Z register 134 in FIG. 14 to receive all of at least the A-C groups of transponder signals then located in the delay line 131. One cycle of operation of the timing circuit 136 is thus completed.

Figure 17:
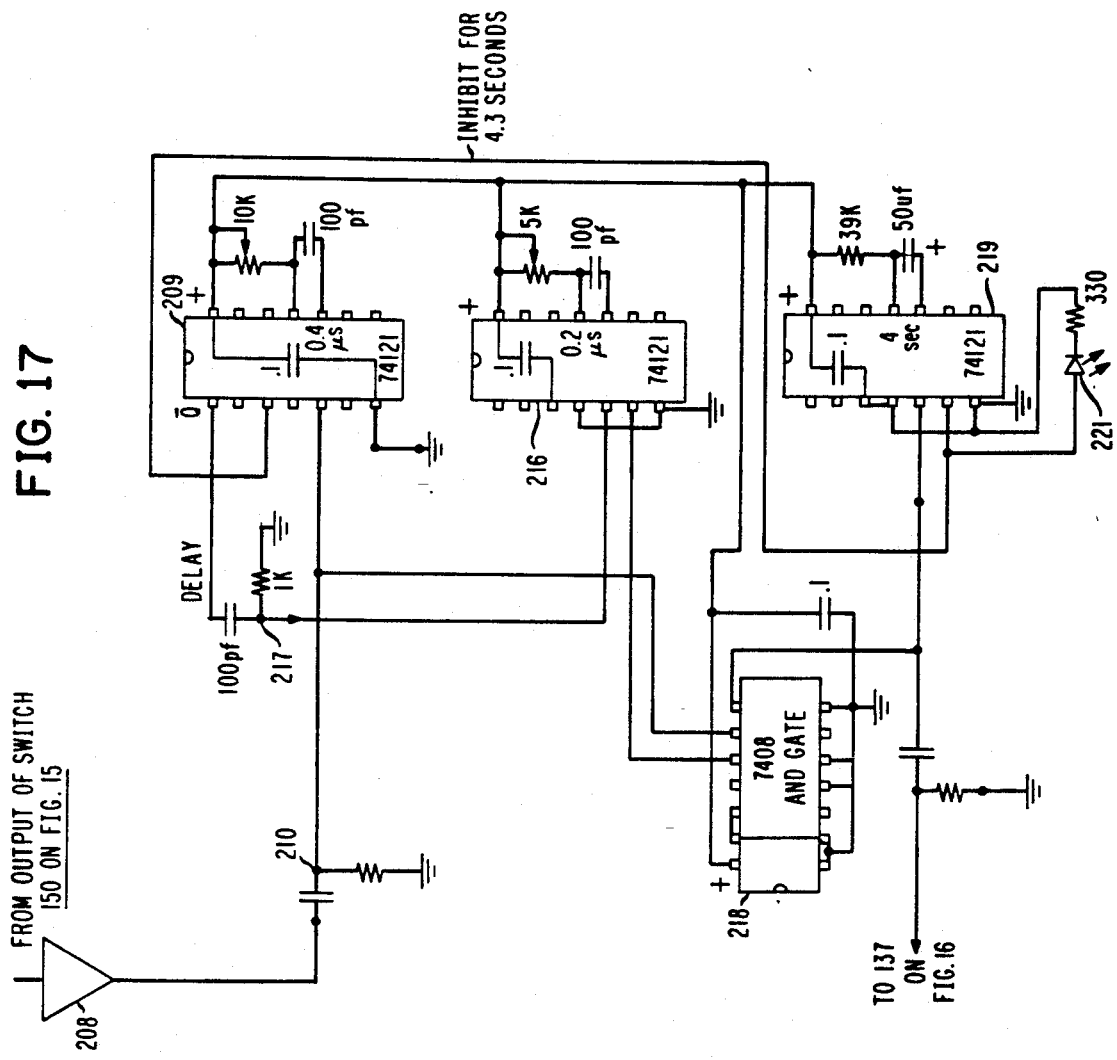
FIG. 17 is a schematic diagram of a simplified circuit for determining approximately the direction in which to look for another aircraft.

FIG. 17 is a diagram of a simplified circuit that can indicate the presence of another aircraft within a certain number of degrees of a direction in line with the central plane of the antenna array. This direction is normally straight ahead of the pilot's aircraft, but, more specifically, it is the forward direction in the plane of symmetry of the antenna array being used. Essentially, I have discovered that, if the circuits generating the pulse that causes the diode connected to the parasitic element have a very fast response time, they will not only be triggered by the leading edge of the incoming transponder pulse shown in FIG. 18 to produce a pulse to control the diode that changes the directivity of the antenna array but will be triggered a second time to produce a second pulse in response to the increase in amplitude of the incoming pulse at the second leading edge when the antenna is suddenly made directive, if that increase is great enough. That will be true if the aircraft transmitting the pulse is within about 45° of the straight-ahead direction of the antenna array. The circuit in FIG. 17 confirms that a second pulse has been produced by generating a pulse that would coincide with at least part of the second pulse and applying the generated pulse and the second pulse to an AND gate to cause the latter to generate an output signal only if both pulses do, in fact, exist.

Figure 18:
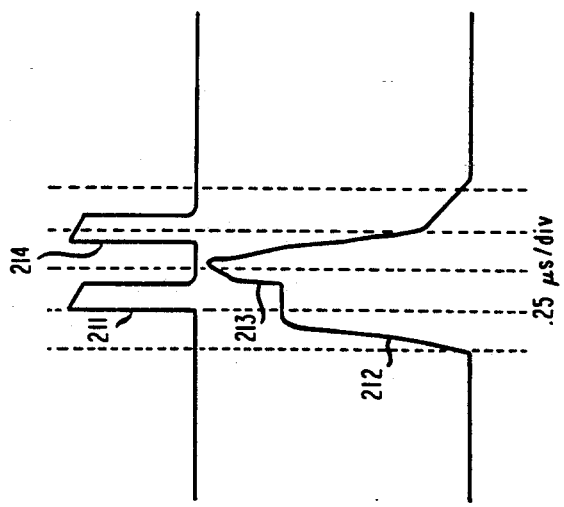
FIG. 18 is a timing diagram for the circuit in FIG. 17.

In the circuit in FIG. 17, an op amp 208 having a fast response is connected to receive the linearly detected transponder pulse signal 212 shown in FIG. 18. This pulse signal reaches the op amp from the linear detectors in FIG. 14 by way of the second arm of the switch 150 in FIG. 15. The output terminal of the amplifier 208 is connected to the B triggering terminal of a one-shot 209 by means of a differentiating circuit 210 to cause that one-shot to produce, at its Q output terminal, a first positive-going pulse similar to the pulse 211. The pulse 211, which is delayed about 0.25 μsec—long enough to coincide with part of the flat top of the transponder pulse—is the pulse that saturates the diode 67 in FIG. 8, thereby changing the antenna array 21 to its directive mode following the leading edge of the incoming transponder pulse 212. When that happens, assuming the other aircraft transmitting the pulse 212 is sufficiently in line with the maximum gain part of the pattern 30 in FIG. 2, there will be a further, sudden increase 213 in the amplitude of the pulse 212.

This rise does not start simultaneously with the pulse 211 but is delayed a short time, for example about 0.015 μsec, and it will not occur at all if changing the directivity of the antenna array does not produce a sufficiently sharp rise in the amplitude of the incoming pulse signal.

That would be true if the other aircraft were far away or off to one side of the center plane of the antenna array, for example, more than about 45° to either side of the center plane, although the size of the angle can be controlled by the gain of the amplifiers ahead of the one-shot 209.

The second, sharp rise 213 produces a second pulse 214 about 0.15 μsec after the rise 213 starts, just like the pulse 211. This second pulse would change the mode of operation of the antenna array from omnidirectional to directional about 0.25 μsec later, in the same way that the first pulse 211 does, except that the second pulse 214 occurs during, or even after, the lagging edge of the pulse 212. Thus, it can have no effect on the pulse 212.

In order to make use of the second pulse 214, the circuit in FIG. 17 includes a second one-shot 216. The $\bar{Q}$ output terminal of the one-shot 209 produces a negative-going pulse in response to the differentiated leading edge of the pulse 212, and this negative-going pulse is passed through a second differentiating circuit 217 to the B triggering terminal of the one-shot 216. The trailing edge of the resulting differentiated pulse will trigger the one-shot 216 to cause the latter to generate a delayed, positive-going pulse at its Q output terminal, and this delayed pulse is connected to one of the input terminals of an AND gate 218.

The incoming transponder pulse 212 continues to be differentiated by the circuit 210, and the second, sharp rise produces another positive spike, which is applied to the B input terminal of the one-shot 209 and to a second input circuit of the AND gate 218, which will produce an output signal only if both of the pulses applied to its input terminals overlap in time. The pulse from the one-shot 216 will occur in delayed response to the leading edge of the pulse 212, but there will be a second pulse to be applied to the second input circuit of the AND gate only if there is a second rise 213 of sufficient sharpness and magnitude.

The output signal from the AND gate 218 is applied to the triggering input terminal of another one-shot 219 to trigger that one-shot, and the Q output terminal of the one-shot 219 is connected across an LED 221 in view of the pilot. When the LED is fired, it indicates to the pilot that there is another aircraft more or less ahead of the pilot's aircraft. In the simplest arrangement, the LED 221 constitutes the display and warning device 26 of FIG. 1.

The one-shot 219 produces a relatively long pulse having a duration of about 4.3 seconds, and the Q output terminal of this one-shot is connected to the A terminals of the one-shots 209 and 216 to inhibit any further operation until the antenna of the ground station rotates a full 360°.

It is also possible to use a circuit like that in FIG. 17 in conjunction with any of the other antenna arrangements shown in FIGS. 3–5 and 13 to allow the LED 221, or separate LEDs related to each parasitic element to be actuated by signals received from directions other than more or less directly ahead of the pilot's aircraft. Essentially, the circuit in FIG. 17 replaces the sample-and-hold circuits 159 and 168 in FIG. 15. Sample-and-hold circuits capable of operating within about 0.25 μsec are difficult to produce and are relatively expensive. The components in FIG. 17 capable of operating at such speeds are much less expensive, and it may be more economical to combine the operation of a number of such circuits to obtain sufficiently specific relative bearing information about another aircraft than to use a smaller number of sample-and-hold circuits.

One of the uses for which the circuit in FIG. 17 would be well suited is to warn the pilot of impending collision with the ground in mountainous terrain. The pilot's own transponder could be triggered manually or electronically to transmit a pulse signal, even single pulse. If the pulse were reflected from a mountain in the path of the pilot's aircraft, it would produce a warning signal by way of the Led 221. The same result would be obtained by the more complex circuit using sample-and-holds, as shown in FIG. 15. If the transponder were actuated to produce a full identification or altitude signal, the system described herein could analyze the echo to warn the pilot of the approach of an aircraft on the same altitude and even with the same identification, which could only be the result of an echo from an object to be avoided.

While this invention has been described in specific terms, it will be understood that its scope is not limited to those embodiments.

What is claimed is:

1. A system comprising:
   (a) antenna means to receive pulse signals that are on a carrier having a certain wavelength and were transmitted from a source located at a certain direction from the antenna means, the antenna means having first and second modes of operation characterized, respectively, by a first directivity condition resulting in a first gain for signals from said certain direction in the first mode and a second directivity condition resulting in a second gain for signals from said certain direction in the second mode;
   (b) receiving means comprising an input circuit connected to the antenna means to receive the pulse signals therefrom to produce a first response to the signals received when the antenna means is in the first mode and a second response to the signals received when the antenna is in the second mode; and
   (c) analytical means associated with the receiving means to make a comparison between amplitudes of the first and second responses to produce an angle-indicating signal based on the comparison.

2. The system of claim 1 in which the pulse signals comprise at least one group of transponder pulse signals comprising first and second framing pulses and encoding pulses between the framing pulses, and the receiving means comprises control means connected to the antenna means to shift the antenna means from one of its modes of operation to the other in predetermined time relationship to the pulse signals.

3. The system of claim 2 in which the control means comprises means responsive to a leading edge portion of at least one of the pulses to shift the mode of operation of the antenna means during that pulse.

4. The system of claim 2 in which the control means comprises means to shift mode of operation of the antenna means for a period of time beginning before one of the framing pulses and continuing for at least a substantial part of that framing pulse.

5. The system of claim 2 in which the control means comprises switching means of controllable conductivity to switch the antenna means from the first mode of operation to the second mode of operation between first and second parts of a received pulse signal.

6. The system of claim 1 in which the antenna means comprises:

(a) a conductive ground plane;

(b) a first element extending from the ground plane by a distance giving the first element an effective length of $\lambda/4$; and (c) a second element extending from the conductive ground plane by a distance giving the second element an effective length of $\lambda/4$, the second element being parallel to the first element and spaced from it in a predetermined direction by a distance between about $\lambda/16$ and $3\lambda/16$.

7. The system of claim 6 in which the distance between the first element and the second element is substantially equal to $\lambda/8$.

8. The system of claim 6 further comprising:

(a) first connecting means connecting a first one of the elements to the input circuit of the receiving means;

(b) second connecting means connecting the other antenna element to the conductive ground plane, said second means comprising means of controllable conductivity; and (c) switching means comprising driving means connected to the means of controllable conductivity to change the state of conductivity thereof to change the mode of operation of the antenna means.

9. The system of claim 8 in which the switching means comprises:

(a) means providing a point having a low impedance to the ground plane at the wavelength $\lambda$;

(b) semiconductor means connected between said point and a location on the second element adjacent the ground plane, and (c) means connected to the semiconductor means and connected to and controlled by the receiving means to supply a current pulse to the semiconductor means to cause the semiconductor means to be conductive to furnish a low-impedance path effectively short-circuiting the location on the second element to the conductive ground plane in response to reception by the antenna means of a pulse signal having the wavelength $\lambda$.

10. The system of claim 8 comprising first and second transmission lines conductively connecting the first and second elements, respectively, to the ground plane, each of the transmission lines having an effective length approximately equal to $\lambda/4$.

11. The system of claim 8 in which the total effective length of the second element is $\lambda/2$, and one end of the second element is conductively connected to the conductive ground plane, said location on the second element being at the electrical center thereof.

12. The system of claim 8 in which the total effective length of the first element is $\lambda/2$, and one end of the first element is conductively connected to the conductive ground plane, said location on the first element being at the electrical center thereof.

13. The system of claim 8 in which the second element comprises:

(a) a quarter-wave first part extending from the conductive ground plane; and (b) a second part comprising a quarter-wave transmission line conductively connected to the conductive ground plane at the end of the transmission line remote from the first part.

14. The system of claim 9 in which the first element comprises:

(a) a quarter-wave first part extending from the conductive ground plane; and (b) a second part comprising a second quarter-wave transmission line conductively connected to the conductive ground plane at the end of the second transmission line remote from the first part of the first element.

15. The system of claim 14 in which the transmission line is a strip line.

16. The system of claim 8 in which the semiconductor means comprises a fast-response diode connected between a point on the second element substantially coplanar with the conductive ground plane and a circuit point having a low impedance to ground at the carrier frequency.

17. The system of claim 16 in which the circuit point having a low impedance to ground at the carrier frequency comprises one end of a quarter-wave transmission line the other end of which has a high impedance to ground.

18. The system of claim 17 in which the means to supply a current to the semiconductor means comprises a high-speed transistor having a collector-emitter circuit connected in series between the diode and a source of operating current.

19. The system of claim 8 comprising an amplifier having an input terminal connected to the junction between the first and second parts of the first element by a conductive link having a length less than the wavelength $\lambda$.

20. The method of determining, from an aircraft that has antenna means characterized by first and second modes of directivity, the location of a source of pulse signals, said method comprising the steps of:

(a) receiving at least a first part of the pulse signals with the antenna means in the first mode;

(b) switching the antenna means from the first mode to the second mode;

(c) receiving a second part of the pulse signals with the antenna means in the second mode;

(d) comparing a ratio of one of the parts to the other part with a table of entries of such ratios, each entry being correlated with a direction: and (e) generating a direction-indicating signal according to the entry that corresponds to the ratio of one of the first and second parts to the other of the first and second parts.

21. The method of claim 20 in which the first mode is omnidirectional and the second mode is directional.

22. The method of claim 20 in which the step of generating the indicating signal comprises the step of comparing the amplitude of the second part of the pulse signal with the amplitude of the first part.

23. The method of claim 22 in which the step of comparing the amplitude of the first and second signals comprises forming a ratio of the amplitude of one of the signals to the other signal, said method further comprising the step of comparing the ratio with a table of such ratios correlated with the direction of maximum gain of the antenna means.

24. The method of claim 22 in which the pulse signal is a transponder signal comprising a pair of framing pulses and the first part is one of the framing pulses and the second part is the other of the pair of framing pulses.

25. The method of claim 22 in which the pulse signal is a transponder signal comprising a pair of framing pulses and the first part is the first part of one of the framing pulses and the second part is a later part of the same framing pulse.

26. The method of claim 20 comprising the step of generating the pulse signals in the aircraft and receiving said signals reflected from stationary reflecting means extending into the path of the aircraft.

27. The method of claim 20 in which the signal is a transponder signal comprising identification pulse groups and altitude pulse groups, said method comprising the steps of:
(a) storing a predetermined number of each of the groups;
(b) comparing the stored groups to separate at least one altitude pulse group from the identification pulse groups; and
(c) analyzing the altitude pulse group to determine the altitude information encoded therein.

28. The method of claim 27 comprising the steps of:
(a) storing identification information from an information pulse group in association with the altitude information from the same transponder signal;
(b) repeating the comparison of subsequently received pulse groups; and
(c) comparing information from the subsequently received pulse groups with previously stored information of the same kind to determine any change in the relative location of the source of transponder signals.

29. The method of claim 27 comprising the steps of:
(a) measuring the field strength of the transponder signal at a first time to obtain information of the measured field strength;
(b) storing information of the first-measured field strength;
(c) measuring the field strength of subsequently received ones of the transponder signals to obtain information of the field strength of the subsequently received transponder signals; and
(d) comparing the stored information of the first-measured field strength with the information of the field strength of subsequently received ones of the transponder signals.

30. The method of claim 20 in which the step of generating an indicating signal comprises the steps of:
(a) generating a first locally generated pulse signal at a predetermined time after the beginning of the first part of the received pulse signals;
(b) changing the directivity of the antenna means from the omnidirectional mode to the directional mode in response to the generated pulse signal; and
(c) determining whether a second pulse signal is locally generated in response to the change of directivity of the antenna.

* * * * *